United States Patent
Park et al.

(10) Patent No.: US 7,966,648 B2
(45) Date of Patent: Jun. 21, 2011

(54) DYNAMIC QUALITY OF SERVICE PRE-AUTHORIZATION IN A COMMUNICATIONS ENVIRONMENT

(75) Inventors: Vincent D. Park, Budd Lake, NJ (US); David R. Mazik, Howell, NJ (US); Hesham Soliman, Victoria (AU)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 11/742,588

(22) Filed: Apr. 30, 2007

(65) Prior Publication Data

US 2007/0297329 A1 Dec. 27, 2007

Related U.S. Application Data

(60) Provisional application No. 60/837,663, filed on Aug. 14, 2006, provisional application No. 60/796,704, filed on May 1, 2006, provisional application No. 60/797,010, filed on May 1, 2006, provisional application No. 60/797,029, filed on May 1, 2006, provisional application No. 60/796,808, filed on May 1, 2006, provisional application No. 60/796,653, filed on May 1, 2006, provisional application No. 60/797,038, filed on May 1, 2006.

(51) Int. Cl.
*G06F 21/00* (2006.01)
(52) U.S. Cl. ............. 726/2; 726/3; 726/4; 709/223; 709/225; 709/226
(58) Field of Classification Search .............. None
See application file for complete search history.

(56) References Cited

U.S. PATENT DOCUMENTS

| | | | |
|---|---|---|---|
| 7,283,561 B1* | 10/2007 | Picher-Dempsey | 370/468 |
| 7,421,487 B1* | 9/2008 | Peterson et al. | 709/223 |
| 2002/0065907 A1* | 5/2002 | Cloonan et al. | 709/223 |
| 2004/0037264 A1 | 2/2004 | Khawand | |
| 2004/0139088 A1* | 7/2004 | Mandato et al. | 707/100 |
| 2005/0014509 A1 | 1/2005 | Semper et al. | |
| 2005/0114541 A1* | 5/2005 | Ghetie et al. | 709/232 |
| 2007/0064604 A1* | 3/2007 | Chen et al. | 370/230 |

FOREIGN PATENT DOCUMENTS

| | | |
|---|---|---|
| GB | 2389745 | 12/2003 |
| KR | 20010103672 | 11/2001 |
| WO | 06020105 | 2/2006 |

OTHER PUBLICATIONS

"The Authoritative Dictionary of IEEE Standards Terms, Seventh Edition", p. 872, copyright: 2000.*
International Search Report, PCT/US07/067913, International Search Authority, European Patent Office, Nov. 16, 2007.
Written Opinion—PCT/US2007/067913, International Search Authority, European Patent Office, Nov. 16, 2007.

* cited by examiner

*Primary Examiner* — Ponnoreay Pich
(74) *Attorney, Agent, or Firm* — Donald C. Kordich

(57) ABSTRACT

The claimed subject matter relates to systems and methods for authorizing services. A method includes receiving a set of data relating to Quality of Service (QoS) pre-authorization, and conditionally processing subsequent QoS configuration requests based at least in part on the pre-authorization information. Depending on the pre-authorization information corresponding to a QoS configuration request, the request may be granted, denied, or result in sending of a request for authorization.

21 Claims, 24 Drawing Sheets

DYNAMIC QUALITY OF SERVICE PRE-AUTHORIZATION IN A COMMUNICATIONS ENVIRONMENT

CROSS REFERENCE TO RELATED APPLICATION

This application claims the benefit of U.S. Provisional Patent Appl. No. 60/837,663, filed Aug. 14, 2006, Entitled "A Method and Apparatus for Quality of Service in a Flash Network"; U.S. Provisional Patent Appl. No. 60/796,704, filed May 1, 2006, Entitled "A Method and Apparatus for Subscriber Service Framework"; U.S. Provisional Patent Appl. No. 60/797,010, filed May 1, 2006, Entitled "A Method and Apparatus for Using Subscriber Profile to Authorize Subscriber"; U.S. Provisional Patent Appl. No. 60/797,029, filed May 1, 2006, Entitled "A Method and Apparatus for Quality of Service in a Flash Network"; U.S. Provisional Patent Appl. No. 60/796,808, filed May 1, 2006, Entitled "A Method and Apparatus for Flash System"; U.S. Provisional Patent Appl. No. 60/797,038, filed May 1, 2006, Entitled "A Method and Apparatus for Connection Control Protocol"; and U.S. Provisional Patent Appl. No. 60/796,653, file May 1, 2006, Entitled "A Method and Apparatus for Mobility Aware Resource Control" of which are incorporated herein by reference.

BACKGROUND

I. Field

The following description relates generally to communications systems, and more particularly to pre-authorization for subsequent dynamic quality of service configuration with respect to one or more traffic flows associated with delivering services to a terminal or host.

II. Background

Communication networks, such as wireless communication networks, broadband networks, and other suitable networks are utilized in connection with transferring data, wherein data can include word processing files, streaming video, multimedia files, voice data, and/or the like. When using such networks, some subscribers to the network may be provided with different quality of service (QoS) parameters than other subscriber. Pursuant to an example, a first individual may subscribe to a Digital Subscriber Line (DSL) network and be provided with first upload and download speeds, while a second individual subscribed to the DSL network may pay a different subscription rate than the first individual and be provided with different upload and download speeds. With still more specificity, the first subscriber may pay a first rate for 1 Megabyte/second download connection speed while the second subscriber may pay a second rate for 512 Kilobyte/second download connection speed.

Additionally, users of networks can be provided with different services. For instance, wireless network subscribers can purchase subscriptions that enable web-browsing, text message delivery and receipt, voice calls, data transmittal (e.g., video, pictures, sound clips, . . . ), gaming, etc. As the delivery requirements of application flows corresponding to various services are different, it may be desirable to associate the traffic flows of various services with different QoS parameters (e.g., latency, bandwidth, . . . ). While in some cases QoS parameters and traffic flow identification criteria (e.g., expected values of various packet header fields for classification) for a service are known at the time that a user is granted access to an operator's network, in other cases some of the required information may not be known until the time that a session of service is established (e.g. sometime after initial access is granted). Thus, it is desirable to support QoS configuration at the time of session establishment which is not currently possible. In general it is desirable to allow the service user (e.g., subscriber) to request the required QoS configuration, but ensure the service provider (e.g., network operator) maintains sufficient policy control over granting such requests. While traditional communication networks have only support a relatively small set of services, emerging communication systems based on the Internet Protocol enable a potentially limitless set of services. These paradigm shifts have exposed a need for improvements in controlling services and managing associated QoS support.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Dynamic generation and process of Quality of Service (QoS) pre-authorization information is provided to facilitate communications. Pre-authorized data relating to a set of QoS services and parameters are exchanged between higher level nodes in a operator network and an access node or base station associated with the network when services are requested by a given device. The higher level operator network nodes may include session initiation severs and authentication/authorization servers for example that initially determine available services for a wireless terminal or other component. After initial negotiations for services, a QoS data set is communicated and maintained by the access node (also referred to as access router), where the QoS data set serves as an available offering of QoS services that can be dynamically enabled over time by the access node—while mitigating further involvement from the higher level nodes in the operator network such as the authentication/authorization server. In an example, a device may be initially authorized for voice or other type of service. In a subsequent request, the device may request additional features or refinements of the initial request such as a certain type of QoS or other network parameters. From the QoS data set, the wireless terminal or other device is free to request a subset of available QoS services from the set and/or request other service features in addition to the initial request. By pre-authorizing a set of services and features that can be provided by the access node on request, static operating requirements supported by previous systems that supported an initial/single QoS negotiation are enhanced.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawing.

DETAILED DESCRIPTION

Systems and methods are provided to dynamically authorize services according to pre-authorized data residing at an access node. In an aspect, a method for authorizing services is provided. The method includes determining a set of data relating to Quality of Service (QoS) pre-authorization parameters and transmitting the set of data, where the QoS pre-authorization parameters are employed to dynamically authorize service requests over time.

Furthermore, various aspects are described herein in connection with a terminal. A terminal can also be called a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stock, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize may modifications may be made to this configuration without departing from the scope or spirit of what is described herein.

Figure 1:
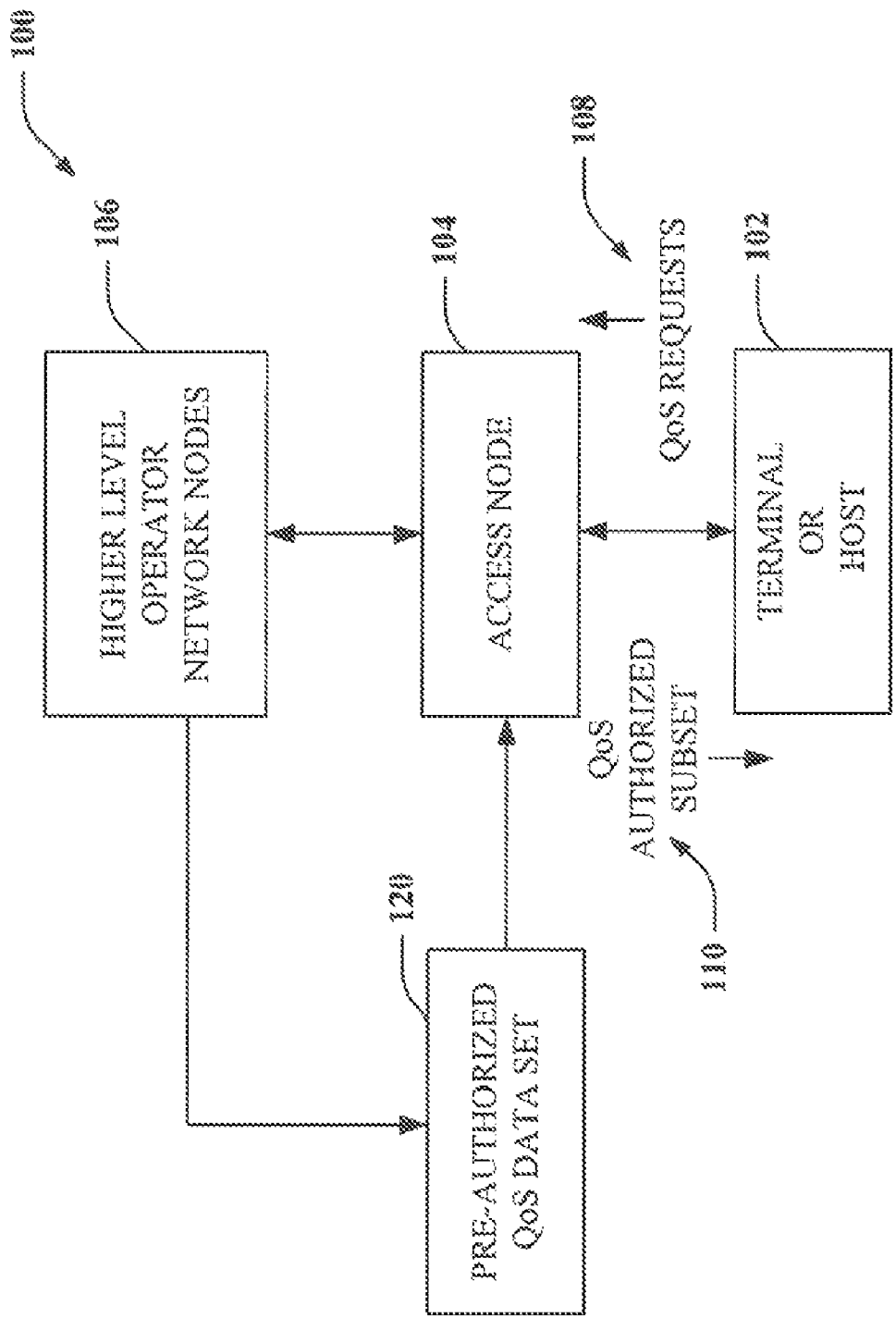
FIG. 1 is a high level block diagram of a system that is provided to illustrate dynamic processing and serving of pre-authorized QoS parameters.

Referring now to FIG. 1, a system 100 illustrates dynamic processing of Quality of Service (QoS) data to facilitate communications in a wireless network. A wireless terminal 102 (also referred to as host) communicates with an access node 104 that is also in communications with higher level nodes of an operator's network 105 (e.g., authorization server, authentication server, accounting server, and so forth). The access node 104 is also referred to as a base station or an access router and employs various nodes, elements, and/or systems included as part of the higher level nodes of the operator's network 106 for such services as authenticating a service request, authorize a service, establishing a session, and so forth as will be described in more detail below. In general, the terminal 102 requests one or more QoS parameters at 108 which are served by the access node 104 as a QoS data subset 110 that has been pre-authorized QoS data set at 120 from which the QoS data subset 110 is derived. For example, the pre-authorized data set 120 may indicate that the terminal 102 is authorized for QoS services X, Y, and Z. In addition to request an initial subset of services, additional requests 108 may query for refinements or enhancements to the initial offering of services. For example, additional request 108 may request for a certain level of QoS above that provided by the initial subset of services.

If the terminal 102 requests one or more of X, Y, or Z at 108 (e.g., the terminal requests service Y), the request can be granted by the access node 110 without further involvements by the operator's network 106. Thus, if conditions were to change or requirements of the terminal 102 were to change, the terminal 102 could request other QoS data at 110 (e.g., request service X). By providing the QoS data at 110 as a pre-authorized set of available QoS 120, dynamic requests 108 can be satisfied by the access node 104.

It is noted that multi-tiered authorization can commence at 110. For instance, the access terminal 102 may request to be served by QoS service Y, the access request to use a specific port number. Thus, along with granting service Y, the access node 106 could also check that the terminal 102 is in fact authorized to communicate over the specific port number indicated. As can be appreciated, multiple requests and subsequent authorizations can be similarly supported by the access node 106.

In an aspect, the system 100 enables Quality of Service (QoS) differentiation for one or more traffic flows to/from a subscriber device 102 obtaining access, e.g., service, via the higher level nodes of the operator's network 106. Definition and provisioning of services can be enabled (including the pre-authorization for subsequent dynamic QoS configuration) for subscribers in an associated home network element, e.g., an Authentication and Authorization Server (AAS) which is part of the operator's network 106. Pre-authorization for subsequent dynamic QoS configuration of the Access Router (AR) 104, e.g., Base Station (BS), through which a subscribe obtains access or service is then signaled from the AAS to the access node 104. Dynamic QoS configuration may then be subsequently signaled by a subscriber device, e.g., host or wireless terminal, and/or another network element, e.g. application service. This provides a high degree of flexibility to define and control services on a per-subscriber basis in a manner that is also scalable, e.g., without the burden of configuring a large number of access nodes 104.

In accordance with another aspect, a subscriber profile (described below) is included in an access grant message sent from the AAS at 106 to the access node 104. The subscriber profile includes pre-authorization information 102 that prescribes the allowable subsequent dynamic configuration of one or more QoS parameters 110 as needed to provide service differentiation between subscribers and/or between various application services authorized form use by a given subscriber. The pre-authorization information or data set 120 prescribed by the subscriber profile may include, but are not limited to, information indicating authorizing the use of one or more services, or types of service, information indicating one or more entities that may initiate subsequent dynamic QoS configuration changes associated with one or more services, information pertaining to controlling subsequent dynamic QoS configuration changes to any of a number of QoS configuration parameters.

In some embodiments, pre-authorization information 120 is prescribed in the form of one or more templates, where each template prescribes the allowable dynamic configuration associated with aa particular service, type of service, and/or identifiable traffic flow. Thus, QoS configuration parameters prescribed by, and/or controlled by, the pre-authorization information 120 may include, but are not limited to, parameters associated with identification of packets as belonging to a traffic flow (e.g., one or more classifier rules), parameters associated with traffic conditioning of a traffic flow (e.g., metering, marking, policing), parameters associated with queuing/scheduling of a traffic flow, and/or parameters characterizing a traffic flow (e.g., a traffic proile) that enables the access node 104 to determine an appropriate QoS configuration 110 to provide adequate servicing of the traffic flow.

The terminal 102, which can be, for instance, a module such as an SD card, a network card, a wireless network card, a computer (including laptops, desktops, personal digital assistants PDAs), mobile phones, smart phones, or any other suitable terminal that can be utilized to access a network. Terminal 102 accesses the network by way of an access node 104. For instance, terminal 102 can be communicatively coupled to access node 104 by way of a wired connection, such as an Ethernet cable, a USB connection, etc. In another example, a connection between terminal 102 and access node 104 may be wireless in nature, in which access node 104 may be a base station and terminal 102 may be a wireless terminal. For instance, terminal 102 and access node 104 may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Similarly to terminal 102, access node 104 can be an access node associated with a wired network or a wireless network. To that end, access node 104 can be, for instance, a router, a switch, or the like. The access node 104 can include one or more interfaces, e.g., communication modules, for communicating with other network nodes. Additionally, access node 104 may be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

As noted above, the system 100 can also include an authentication and authorization server (AAS) at 106, which aids in controlling the ability of terminal 102 to send/receive data over a network through use of access node 104. While shown as being a separate entity, it is understood that AAS 106 can be included within access node 104. With respect to authentication/authorization, terminal 102 can provide data that is indicative of identity of such terminal 102 and/or a subscriber associated therewith to AAS 106 by way of access node 104. The access node 104 can relay the identifying data to AAS 106 without modification or can modify such data according to any suitable data format/protocol. Upon receipt of the identifying indicia, AAS 106 can authenticate terminal/subscriber identity and determine whether terminal 102 (and/or a subscriber) is authorized for one or more services.

The process of authentication/authorization may, and in some embodiments does, include the exchange of one or more signals between terminal 102, access node 104, and/or AAS 106. If terminal 102 and/or a subscriber associated therewith is authorized for services, AAS 105 can relay a profile assigned to terminal 102 (or the associated subscriber) to access node 104, wherein the profile includes at least description of QoS parameters associated with one or more traffic flows relating to terminal 102, wherein a data flow can be defined as a series of related data packets (e.g., as identified based on inspection of packet headers and/or packet payloads). The profile can also include filter rules that facilitate association of data packets to traffic flows and associating prescribed QoS treatments to certain traffic flows and/or data packets. The profile can also include pre-authorization information that can be provided as part of a template that is described in more detail with respect to FIG. 8. Pursuant to an example, data packets with headers indicating that such packets relate to voice data can be collectively referred to as a traffic flow. similarly data packets indicating that such packets relate to video data can be a separate traffic flow.

Access node 104, upon receipt of the profile, can monitor and enforce QoS treatment described within the received profile. For instance, a parameter that can be utilized in connection with described QoS treatment may relate to acceptable latency associated with a traffic flow, and access node 104 can perform scheduling with respect to the traffic flow to maintain an acceptable latency as described within the profile provided from AAS 106. Other QoS parameters within the received profile can relate to minimum acceptable data rate with respect to a particular traffic flow type, maximum acceptable data rate with respect to a particular traffic flow type, et. Such parameters can be defined numerically (e.g., a minimum data rate with respect to a first traffic flow type is 128 Kb/sec) and/or relatively defined (e.g., latency with respect to a first traffic flow type is to be ½ of latency with respect to a second traffic flow type). Still further, definition of parameters can be contingent upon certain system or network state(s). In an example, a particular parameter may be relatively defined until reaching a threshold and thereafter numerically defined (e.g., a minimum data rate with respect to a first traffic flow should be twice as much as a second traffic flow, but not to exceed 1 Megabyte/second).

Additionally, the profile provided to access node 104 from AAS 106 can support object instances therein, thereby reducing duplication of parameter definitions within the profile. For example, a gaming application that is authorized for use with respect to terminal 102 may use three parallel traffic flows to support such application. Rather than defining parameters with respect to each traffic flow, a definition can created for a single traffic flow and instances of such definition can be utilized for related traffic flows. Moreover, the profile can include filter (e.g., classification) rules, which can be employed in connection with identifying a particular traffic flow and associating such flow with an instance that determines QoS treatment to assign to the traffic flow. The access node 104, upon receipt of the profile, can be configured to provide QoS treatment to terminal 102 as prescribed in the profile and the pre-authorized data set 120. Thus, access node 104 can provide different QoS treatment with respect to various traffic flows and multiple users, thereby enhancing system performance and user experience.

Figure 2:
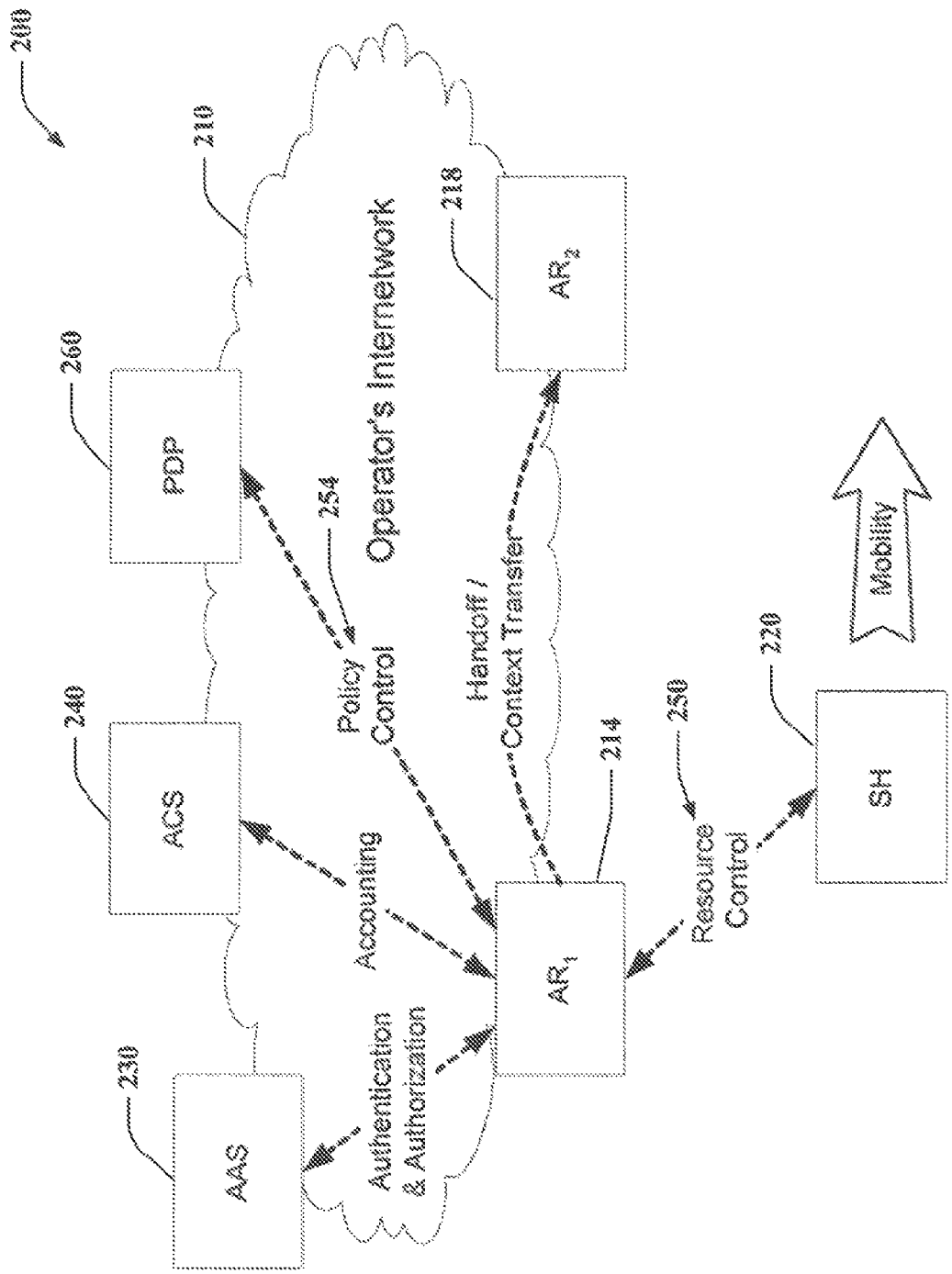
FIG. 2 is a block diagram of a system that is provided to illustrate an example network that can employ dynamic pre-authorization data.

Referring now to FIG. 2, an example network 200 is illustrated that can employ dynamic QoS, pre-authorization data. The system 200 depicts an operator's inter-network 210 with two Access Routers (ARs) 214 and 218, through which a Subscribe Host (SH) 220 may obtain access, and several additional network elements. Logical interfaces between the various elements are indicated using dashed lines. The ARs 214-218 are network elements in the context of service control, since they are positioned to control access to services available via the operator's infrastructure and to directly control QoS for such services over the access links. However, a number of other network elements likely also play a role in a complete solution, e.g., to control the operation of the ARs 214-218. The following description addresses each of the logical interfaces, as well as the associated network elements, shown in the system 200.

A trusted indication of subscribe identity (or a subscriber identity associated with the SH 220) is fundamental to the notion of controlling services on an individual subscriber basis. Typically, a subscriber's indicated identity is authenticated, e.g., using an Extensible Authentication Protocol (EAP), prior to being granted access to the network and higher layer services. This initial authentication and authorization process commonly involves communication between the element through which access is being requested, e.g., the AR 214-218, and a separate Authentication and Authorization Server (AAS) 230, e.g., using a Remote Dial-In User Service (RADIUS) protocol. Provided that the subscriber's identity is authenticated by the AAS 230 and the subscriber 220 is authorized to obtain access, an indication that access may be granted is returned from the AAS 230 to the element through which access is being requested.

Following an initial access grant, the AR 214-218 may being sending accounting information, e.g., packet/byte counts, to an Accounting Server (ACS) 240. Accounting for traditional IP best effort service often consists of only simple aggregate packet/byte counts for traffic sent/received. However, supporting a richer set of subscriber services also likely employs accounting mechanisms that enable service-based billing and charging. Thus, accounting information, e.g., collected/reported by the AR 214-218, should include details regarding the services used and/or the level of QoS provided.

In accordance with the architecture presented herein, the SH 220 may change its point of attachments from one AR to another, a process generally referred to as handoff. Mobile IP (MIP) is one approach to supporting mobility in IP inter-networks, using tunnels to manage routing/forwarding thus allowing a mobile host to continue using the same address as it changes it point of attachment. A mechanism for Context Transfer (CT) can be employed to minimize service disruption upon handoff. By transferring information about service authorization and QoS configuration between ARs upon handoff, equivalent service can more quickly and efficiently be established via the new AR. Note that upon receiving QoS configuration information associated with a SH 220 moving to a new AR, the new AR should perform admission control to determine if sufficient resources are available prior to provided the indicated service.

A resource control interface 250 employs a signaling protocol by which the SH 250 may request QoS configuration changes following initial access grant. As noted above, this may include a set of available QoS data and parameters that can be requested by the SH 220 as dynamic conditions require. In general, one cannot assume that end-to-end QoS is supported between the SH 220 and another host with which the SH is communicating. However, the system 200 provides a QoS architecture wherein, for a wide range of services, resource reservation is only required in the AR 214-218 and not along the entire data path. Incases where resource reservation is desired in additional nodes along the data path, alternative or additional resource control signaling may be used. In accordance with the model, the SH 220 should be able to request resources for traffic both sent and received. While the system 200 depicts the resource control interface 250 between the SH 220 and AR, it is also possible to support QoS configuration, via an equivalent or similar resource control interface, from elements in the operator's inter-network 210, an operator host (OH) or application server, on behalf of the SH.

A policy control interface 254 represents a mechanism by which authorization may be checked for QoS configuration changes, e.g., requested via the resource control interface 250. Note that the policy control interface 254 is depicted between the AR 214 and a non-specific network element functioning as a PDP 250, where the PDP function could be located in a dedicated policy server, an application server, or some other network element, for example. A possible reason for this distinction is that the appropriate placement of the PDP function 260 may be dependent on a particular service. In general, different services may even be associated with different PDPs, thus in accordance with some embodiments of the invention a service definition includes an indication of the associated PDP.

Figure 3:
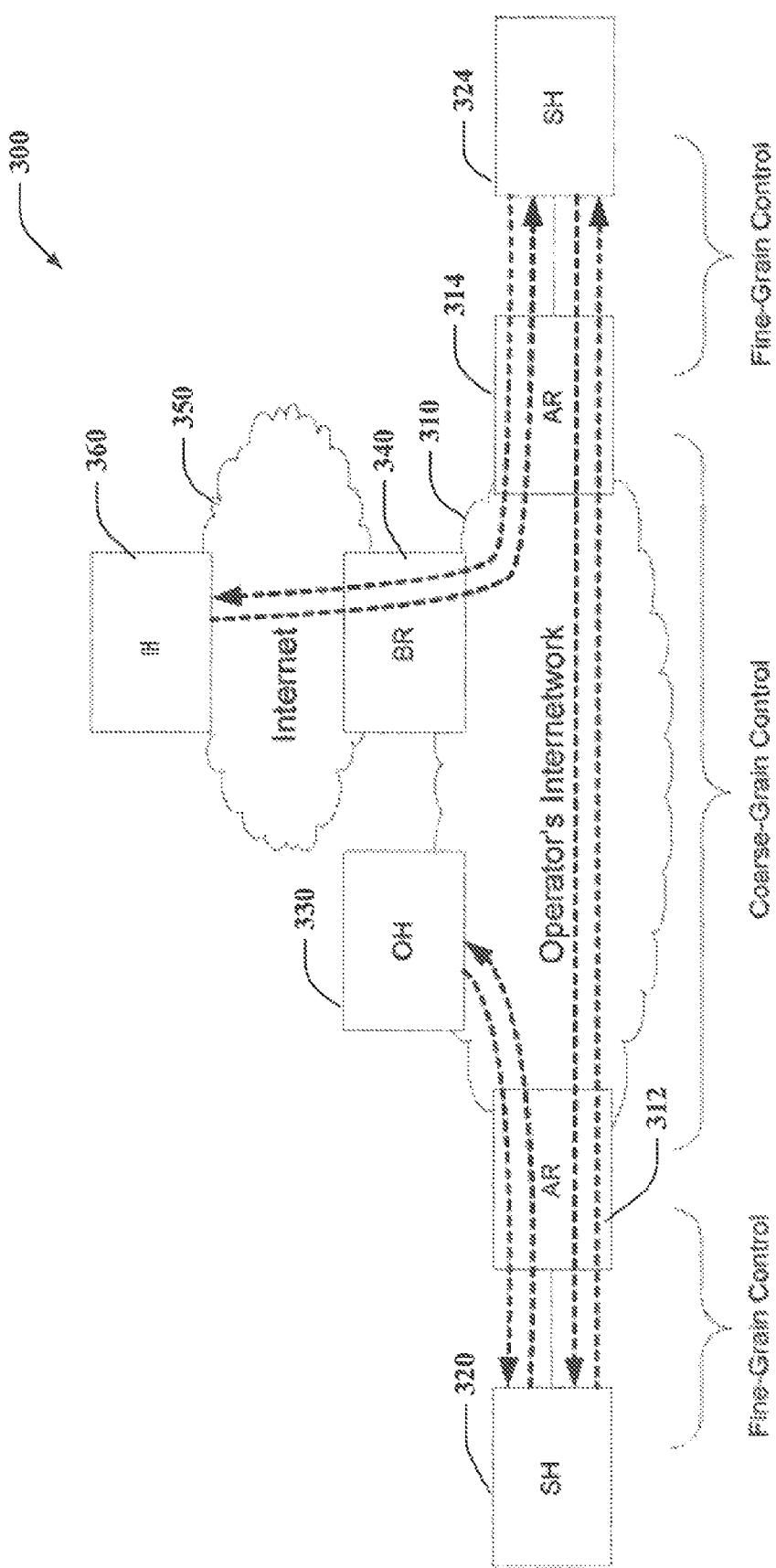
FIG. 3 is a block diagram that illustrates a segmented QoS architecture.

Now referring FIG. 3, a wireless communication system 300 illustrates a segmented QoS architecture. The system 300 or QoS architecture depicts an operator's inter-network 310 that include one or more ARs 312-314, through which one or more SHs 320-324 may obtain service and communicate with other hosts. The operator's inter-network 310 may further include one or more Operator Hosts (OHs) 330, e.g., application servers with which the SH 320 may communicate, and a Border Router (BR) 340 that provides interconnectivity to external networks 350 not under the operator's control, e.g., the Internet. In the reference architecture 300, the Internet 350 is also depicted as including one or more Internet Hosts (IHs) 360 with which the SH 320-324 may communicate.

From a QoS perspective, the system 300 includes multiple distinct segments that are differentiated primarily by the granularity of QoS control. In some cases, the access link between an AR 312-314 and the coupled SH 320-324 is a constrained resource, e.g., cellular and/or dial-up, and thus employs fine-grain QoS control to enable service differentiation and meet target delivery objectives. The use of moderate to high rate links in the core of the inter-network 310 as well as the statistical multiplexing gain that results from combining a large number of subscriber traffic flows allows for coarse-grain QoS control across the inter-network. In some cases, external networks not under the operator's control can be assumed to have no QoS control. The dashed lines depicted in the system 300 represent exemplary traffic flows between two SHs 320 and 324 as well as between the SH 320 and the OH 330, e.g., an application server located in the operator's inter-network 310, and between an SH and IH, e.g., an application server located in the Internet. Note that traffic flows directed to/from a particular SH traverse the AR 312-314 to which the SH 320-324 is coupled. This enables the AR to not only provide fine-grain QoS control over the access link, but also to perform traffic conditioning and to function as the policy enforcement point (PEP) as needed.

Figure 4:
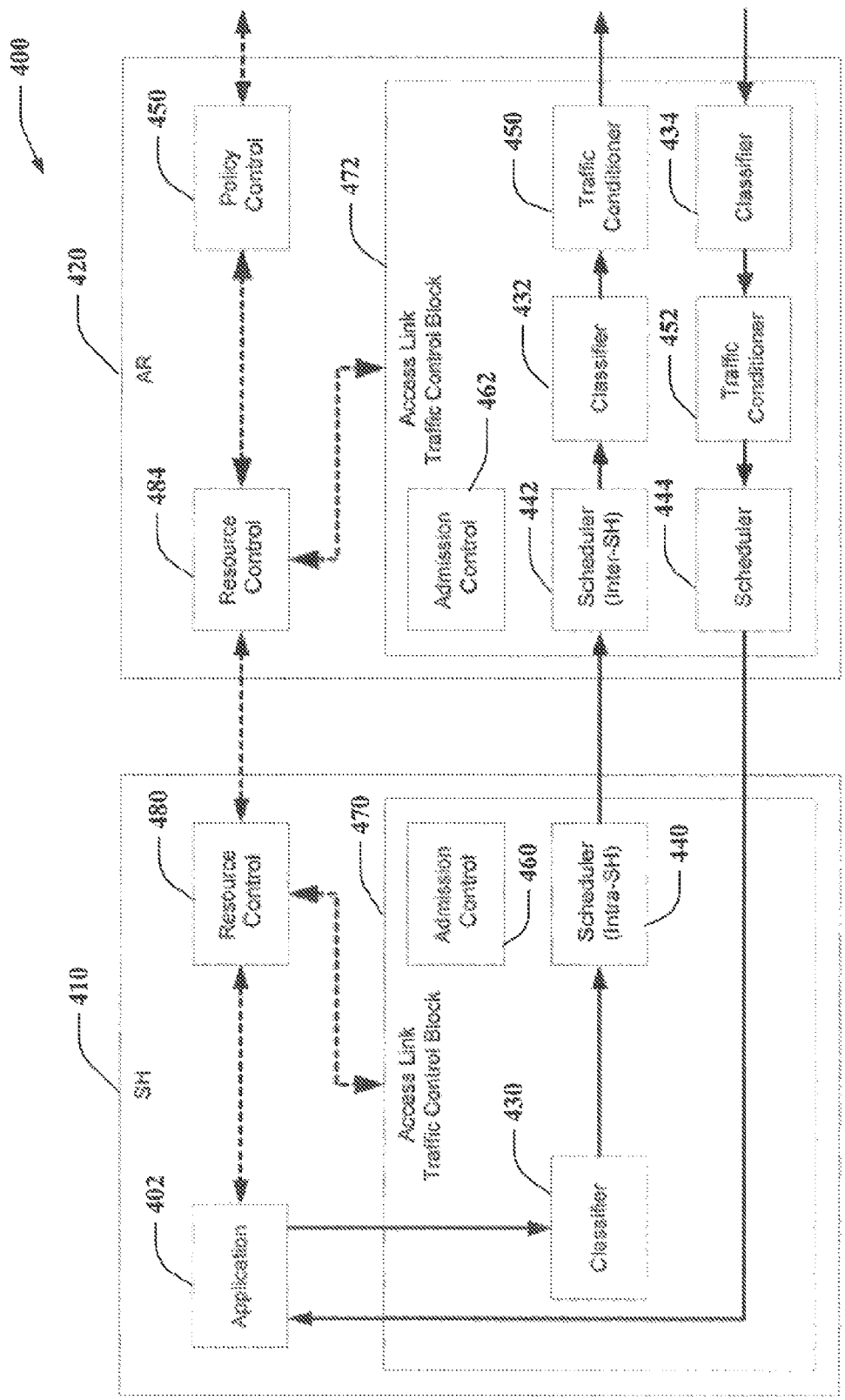
FIG. 4 illustrates example host and access router modules.

Now referring to FIG. 4, a system 400 illustrates example host and router communications modules. The system 400 depicts an application 402 in an SH 410 that is sending and receiving data traffic over an access link and through an AR 420 (data traffic flows are depicted as solid-line arrows). To provide the appropriate QoS treatment, packets associated with a traffic flow may be processed by multiple functional entities in both the SH 410 and AR 420 (e.g., classifier 430-434, scheduler 440-444, traffic conditioner 450-452). In the SH 410 and AR 420, the relevant functional entities have been grouped together, along with an admission control functional entity 460-462, and labeled an access link traffic control block 470-472.

Packets belonging to a traffic flow directed through the AR 410 to the SH 420 are shown to pass through several functional entities in the access link traffic control block 472 of the AR prior to delivery over the access link. Specifically, the packets pass through the classifier 434 (to identify packets associated with the traffic flow), the traffic conditioner 454 (to meter, mark, police, and/or shape packets associated with the traffic flow upon egress from the operator's DS domain), and the scheduler 444 (to control the delivery of packets associated with the traffic flow over the access link). Note that for packets directed from the AR 420 to the set of associated SHs, the AR scheduler 444 can control the use of access link resources both between associated SHs and between specific traffic flows directed to each SH. For packets belonging to a traffic flow directed from the SH 410 through the AR 420, the packets are shown to pass through several functional entities in the access slink traffic control block of the SH prior to delivery over the access link, as well as several functional entities in the access link traffic control block of the AR subsequent to delivery over the access link.

In the SH 410, the packets pass through the classifier 430 (to identify packets associated with the traffic flow) and the scheduler 440 (to control the delivery of packets associated with the traffic flow over the access link). In the AR 420, the packets pass through the scheduler 442 (which may or may not be present depending on the access link technology), the classifier 432 (to identify packets associated with the traffic flow), and the traffic conditioner 450 (to meter, mark, police, and/or shape packets associated with the traffic flow upon ingress to the operator's DS domain). Note that for packets directed from an SH through an associated AR, the SH scheduler 440 can generally control the use of access link resources that have been dedicated to the SH 410. Depending on the access link technology, the AR 420 may also include a scheduler 442 to control the allocation of resources between the set of associated SHs.

The application 402 in the SH 410 also interfaces to a resource control functional entity 480 in the SH 410 that provides the capability to request appropriate QoS treatment of traffic flows associated with authorized services via QoS signaling exchanged with a resource control functional entity 484 in the AR 420. The resource control functional entity 484 in the AR 420 may further interface with a policy control functional entity 450 in the AR 420 to perform service authorization checks. The resource control functional entities in the SH 410 and AR 420 also interface to the respective access link traffic control blocks to perform resource admission control checks and to configure other functional entities as needed to provide the appropriate QoS treatment. Note that while the AR 420 can be a PEP, it may or may not be a PDP. Thus, the policy control functional entity 450 may also exchange signaling with a PDP located in another network node (e.g., a policy server or application server).

Figure 5:
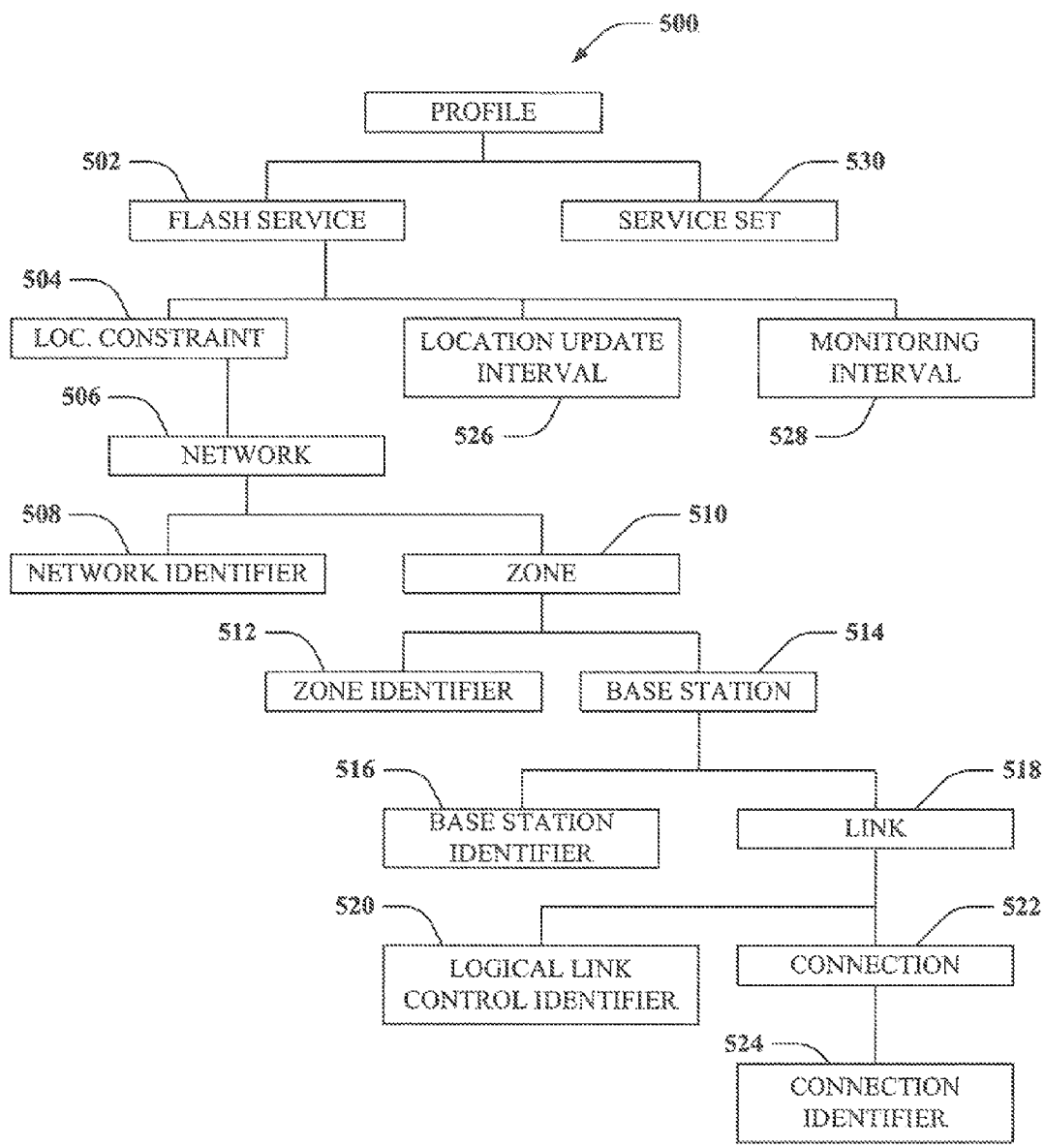
FIG. 5 illustrates example contents of a profile.

Turning now to FIG. 5, an example profile 500 in accordance with one or more aspects described herein is illustrated. The profile 500 is a logical grouping of parameters that prescribe aspects of services authorized for use by a subscriber (a particular mobile terminal). it is understood, however, that field/elements within profile 500 can be altered, such that how elements are prescribed can be altered, logical arrangements can be altered, number of elements can be altered, and names of elements can be altered while in accordance with the subject claims. The profile 500 can be associated with a slash service element 502, which is a logical grouping of parameters associated with establishing and maintaining connectivity by way of an interface, such as an air interface, including a FLASH air interface. The flash service element 502 can e associated with a location constraint element 504, which is a collection of parameters that prescribe locations (or points of attachment) through which the subscriber may be granted access for services. When location constraint element 594 is included within the profile 500, access can be limited as prescribed by elements included within location constraint element 504. Omission of location constraint element 594 indicates that access is not restricted to a list of prescribed locations, but can be restricted by other means, such as a roaming agreement.

The profile 500 can additionally include a network element 506, which can be a collection of parameters associated with a particular network through which a subscriber (terminal) may be granted access for services. Access can be limited to a set of indicated networks and, if desired, may not be granted through other networks. Network element 506 can be associated with a network identifier element 508, which can be a globally unique identifier of a network through which the subscriber can be granted access for services. Network element 506 can additionally be associated with a zone element 510, which can be defined as a collection of parameters associated with a particular zone within a network through which the subscriber can be granted access for services. Access within a network can be limited to the set of indicated zones within zone element 510. Absence of zone element 510 can indicate that access within the network identified within network identifier element 508 is not restricted to a set of prescribed zones.

Zone element 510 can be related to a zone identifier element 512, which can be a locally unique identifier of a zone within a network through which the subscriber may be granted access for services. Zone element 510 can also be related to a base station element 514, which can be defined as a collection of parameters associated with a particular base station or access node (within a zone of a network) through which the subscriber may be granted access for services. Access within a zone can be limited to a set of indicated base stations within base station element 514. Absence of a base station element 514 can indicate that access within an identified zone is not restricted to a set of particular base stations.

Base station element 514 can be associated with a base station identifier 516, which can be a locally unique identifier of a base station within a zone of a network through which the subscriber may be granted access for services. Base station element 514 can additionally be related to a link element 518, which can be a collection of parameters associated with a particular link (corresponding to an identified base station within a zone of a network) through which a subscriber may be granted access for services. For example, access by way of a base station can be limited to a set of links prescribed within the link element 518, and absence of a link element 518 within a profile can indicate that access by way of the corresponding base station is not restricted to a certain set of links.

Link element 518 can be associated with a logical link control identifier element 520, which can be a locally unique identifier of a link corresponding to a base station within a zone of a network through which the subscriber can be granted access for services. Link element 518 can also be associated with a connection element 522, which is a collection of parameters associated with a particular connection through which the subscriber can be granted access for services. For example, access by way of a link can be limited to a set of indicated connections. Absence of a connection element can indicate that access by way of the corresponding link is not restricted to a set of prescribed connections. Thus, if access by way of a particular link is not further constrained, then it may be desirable to not include connection element 522 within profile 500. Connection element 522 can be associated with a connection identifier element 524, which can be locally unique identifier of a connection corresponding to a link and base station within a zone of a network through which the subscriber may be granted access for services.

Profile 500 can additionally include a location update interval element 526, which can be a duration of time (e.g., in seconds) between successive instances in time at which a location update should be performed by a wireless terminal while such terminal is in a "sleep" mode, for example. A monitoring interval element 528 can indicate a duration of time ( e.g., in milliseconds) between successive instances in time at which monitoring for pages is to be performed by a wireless terminal while in "sleep" mode. Profile 500 can additionally include a service set element 530 (described in detail below), which can include a set of service class and subscriber service logical data constructs that pertain to enabling and controlling services. Such element 530 can include QoS parameters relating to certain traffic flows associated with a particular terminal (e.g., wireless terminal). The element 530 also includes pre-authorization templates or data for dynamic quality of service configuration from an access node. The information comprising the profile, including the QoS parameters, can be conveyed using XML and the structure and other characteristics, e.g., data types, formats, and/or value restrictions, of the information can be defined by an associated XML schema.

Figure 6:
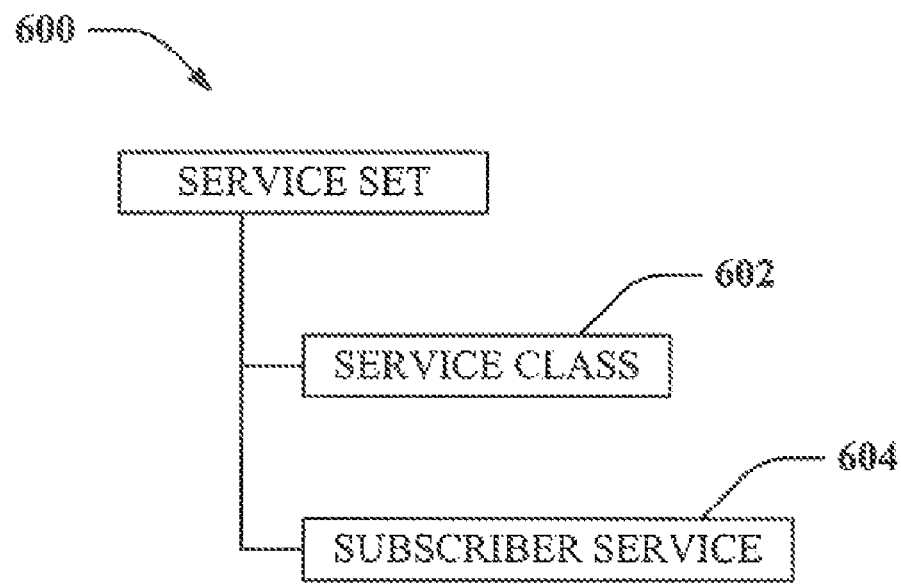
FIG. 6 illustrates an example format for a subscriber service set.

Now referring to FIG. 6, an example service set element 600 (such as service set element 530 of FIG. 5) is shown and described. It is to be understood, however, that such element is merely provided as an example, and that elements therein and/or logical associations between elements can be deleted, altered, and the like and remain in accordance with the claimed subject matter. QoS definition and control can be based at least in part upon two data constructs within service set element 600: a service class element 602 and a subscriber service element 604. While shown as a "subscriber" service element, it is understood that such element can relate to a subscriber device, e.g., wireless terminal. Thus, a subscriber service element can be included within a profile as a consequence of identifying indicia of a terminal and/or identifying indicia of a subscriber. Depending on the services to be provided the profile may include multiple occurrences of either or both of these data constructs. Service class element 602 (data construct) can provide a common mechanisms for prescribing QoS treatment of a traffic flow associated with an instance of a particular service class. For example, packets provided to/from a host device are classified into one or more traffic flows, where a given traffic flow may include only a specific packet stream corresponding to a particular application or may include an aggregation of packet streams corresponding to multiple applications.

Each identified traffic flow can then be associated with an instance of one or more service class elements (602). An associated service class of each identified traffic flow can provide a basis for admission control, scheduling, and traffic conditioning functions of a host device and/or an access node (access router, base station, etc.). While service class element 602 can pertain to QoS treatment, service set element 600 can pertain to policy control (e.g., authorization for services) and service definition (e.g., setting parameters values, association of identified traffic flows with instances of particular service classes to support QoS, . . . ). Each service set element can include zero or more service class elements and zero or more subscriber services elements.

Figure 7:
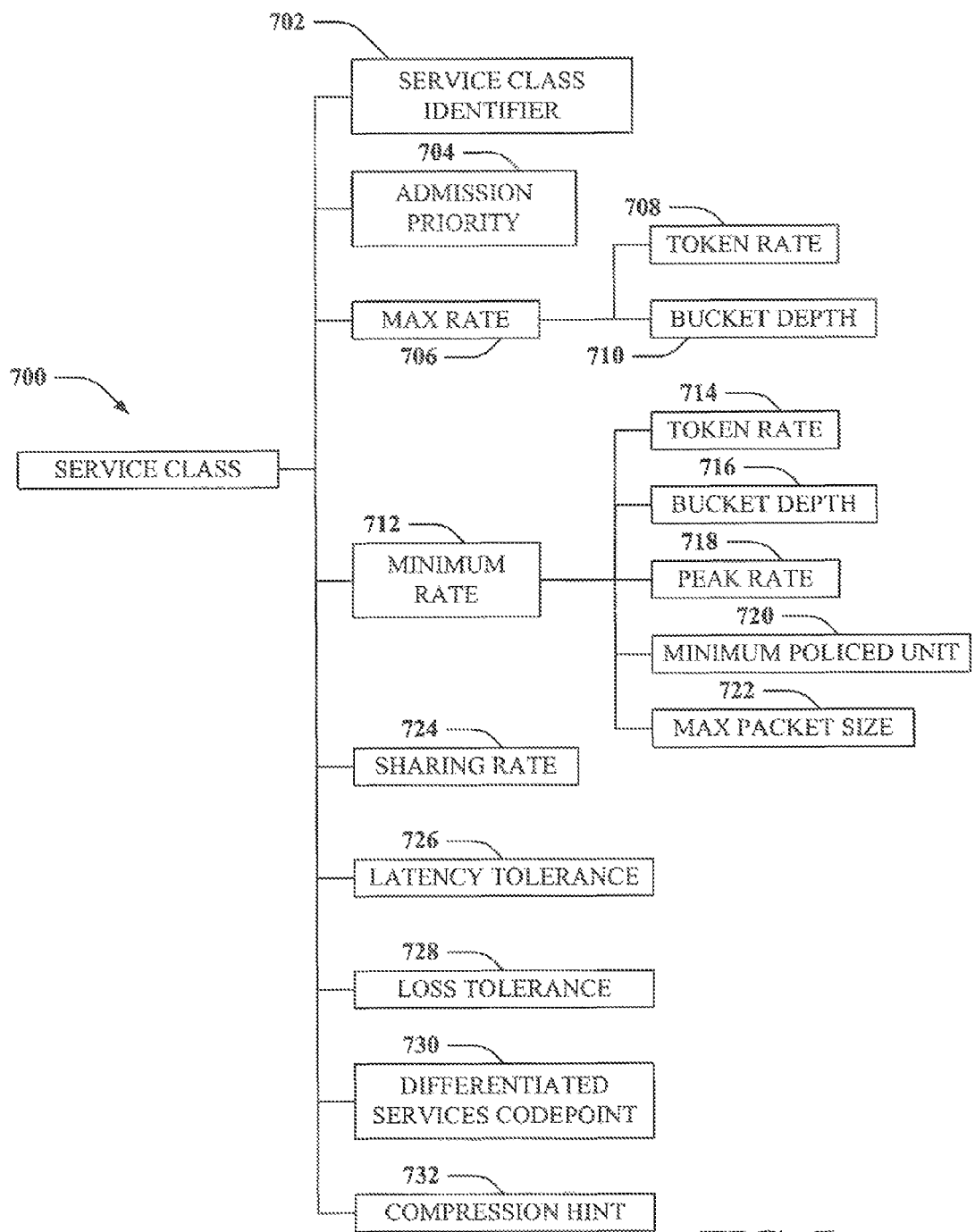
FIG. 7 illustrates an example format for a service class type.

Now turning to FIG. 7, an example service class element (such as service class element 602 shown in FIG. 6) is illustrated. Again, service class element 700 is provided as an example of one particular manner for defining QoS treatment within a profile. Other manners for doing so are contemplated by the inventors and are intended to fall under the scope of the hereto appended claims. Service class element 700 can include a service class identifier 702, which can be a globally unique identifier (e.g., 32 bit) of a defined service class, which can be represented using a notation x:y, where x and y can be hexadecimal values corresponding to a first number of bits (prefix) and a second number of bits (suffix), respectively, of service class identifier 702. For example, a set of service classed defined by a particular operator or standards organization can utilize a common service class identifier prefix.

The service class element 700 can also include an admission priority element 704. For service classes that prescribe target delivery objectives requiring allocation of dedicated resources (e.g., service classes prescribing a minimum rate and/or latency bound), admission priority element 704 indicates a relative ordering of such service classes for purpose of making resource allocation admission control decisions. Specific use of admission priority can be implementation dependent, and possible uses include priority queuing of pending resource allocation requests and/or priority of preemption of resource allocations.

A max rate element 706 can indicate a maximum data rate that can be provided to a traffic flow associated with an instance of a particular service class. maximum rate element 706 can be further defined by token bucket parameters, such as described within a token rate element 708 and a bucket depth element 710. token rate element 708 can be in units of kilobits/second (where kilo indicates 1000), and bucket depth element 710 can be in units of byes, for instance.

A minimum rate element 712 can indicate a target minimum data rate to be provided to a traffic flow associated with an instance of a service class. Minimum rate element 712 can be further defined by a token rate element 714, a bucket depth element 716, a peak rate element 718, a minimum policed unit element 720, and a max packet size element 722. Token rate element 714 and peak rate element 718 can be in units of kilobits/second (where kilo indicated 1000), while bucket depth element 716, minimum policed unit element 720, and max packet size element 722 can be in units of bytes.

A sharing weight element 724 can be utilized to indicate a relative proportion of service (e.g., rate or resources) that a traffic flow associated with an instance of a service class should receive when competing for service with traffic flows associated with other service class instances. Thus, after the target delivery objectives (e.g., minimum rates and/or latency bounds) have been met for all admitted service class instances, any remaining service capacity should be distributed among competing service class instances that are not otherwise limited (e.g., by indication maximum rate) proportionally to their corresponding sharing weights.

A latency tolerance element 726 indicates an acceptable access link latency for packets belonging to a traffic flow associated with an instance of a service class, where access link latency includes delays associated with queuing, scheduling, and transmission. With high probability, packets belonging to a traffic flow associated with an instance of the service class should be delivered over the access link with latency below the indicated tolerance. As an example, latency tolerance element 726 can be associated with units of milliseconds.

A loss tolerance element 728 can indicate an acceptable probability of loss for packets belonging to a traffic flow associated with an instance of a service class, where sources of loss include queue management and unrecoverable transmission errors. Packets belonging to a traffic flow associated with an instance of an identified service class should be delivered over the access link with loss probability below an indicated tolerance. The loss tolerance element 728 can include data relating to number of loss packets per 100,000 packets, for example. A differentiated services (DS) codepoint 730 can indicate a DS codepoint with which packets in a traffic flow associated with an instance of an identified service class should be marked.

A compression hint element 732 can indicate that header compression is likely applicable to packets belonging to a traffic flow associated with a particular instance of a service class. compression hint element 732 can include information to assist in determining the applicable type of compression and/or parameters needed for compression.

Figure 8:
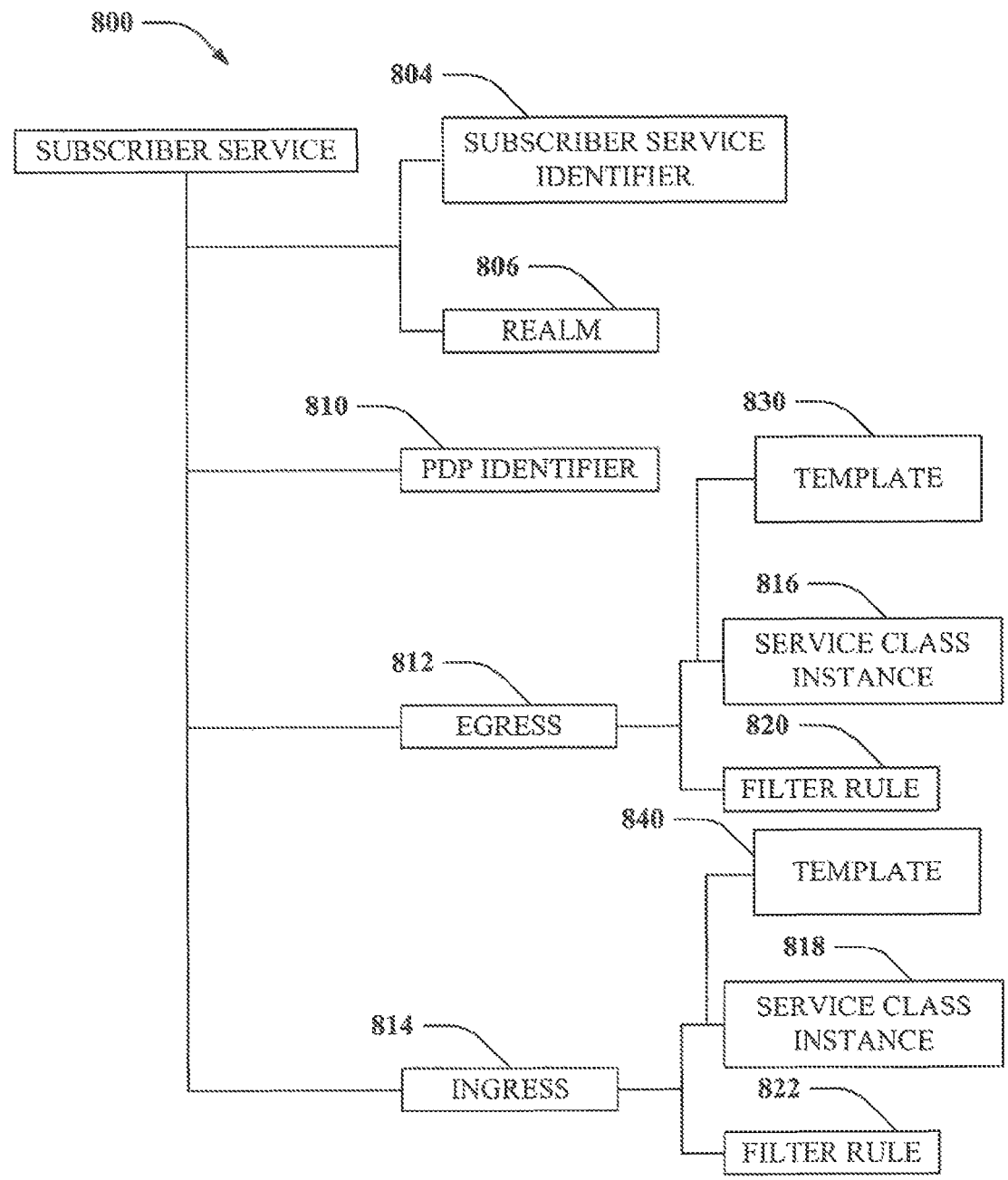
FIG. 8 illustrates an example subscriber service type.

With reference to FIG. 8, an example subscriber service element 800 (such as subscriber service element 604 of FIG. 6) is shown and described. Again, element 800 is provided as one particular manner for defining a service. Other manners for doing so are contemplated by the inventors and are intended to fall under the scope of the hereto appended claims. The subscriber service element 800 can include a subscriber service identifier element 804, which can be a globally unique identifier of a certain subscriber service, which can be represented using notation x:y, where x and y can be hexadecimal values corresponding to a first set of bits (prefix) and a last set of bits (suffix), respectively, of subscriber service identifier element 804. A set of subscriber services defined y a particular operator or standards body can use a common subscriber service identifier prefix. A realm element 806 can indicate a domain with which a subscriber service is associated with a local domain. This provides a basis for better controlling services when roaming between various network operators.

Subscriber service element 800 can include a Policy Decision Point (PDP) identifier element 810. A PDP identifier element 810 can be an identifier, such as an IP address or host name, of the PDP to be used for QoS configuration change requests associated with a particular subscriber service. The subscriber service element 800 can additionally include an egress element 812, which is a logical grouping of service class instances, filter rules, and service class instance templates applicable to egress traffic from an access router to a subscriber over a corresponding access link, and an ingress element 814, which is a logical grouping of service class instances, filter rules, and service class instance templates that are applicable to ingress traffic to an access router from a subscriber over a corresponding access link.

Egress element 812 and ingress element 814 can each include one or more service class instance elements 816 and818, respectively. Service class instance elements 816 and 818 can define static service class instances, e.g., identify a particular service class element of which an instance is required and with which a traffic flow will be associated by one or more filter rules. A static service class instance can conceptually be viewed as a persistently requested instance of a particular service class. Depending upon parameters of a corresponding service class, an admission control decision may be required. Thus, at any given point in time a static service class instance may or may not be acted (e.g., admitted), depending upon resource availability and admission priority, but should be made active whenever possible.

Egress element 812 and ingress element 814 can also each include one or more filter rule elements 820 and 822, respectively. Filter rule elements 820 and 822 define a classifier filter rule for the purpose of mapping packets belonging to a traffic flow with a defined service class instance. Each filter rule element can include a priority indicating the order in which it should be applied with respect to other filter rule elements, specification of packet matching criteria (e.g., values or ranges of values corresponding to one or more packet header or payload fields), and an indication of the service class instance with which matching packets should be associated. Filter rule elements 820 and 822 can also be used to discard packets belonging to a traffic flow by mapping them to an instance of a null service class.

Egress element 812 and ingress element 814 can also each include one or more service class instance template elements 830 and 840, respectively. Service class instance template elements 830 and 840 prescribe pre-authorization for dynamic service class instances, e.g., identify a particular service class element of which an instance may be dynamically requested as well as prescribe policy constraints regarding the requested service class instance and/or the filter rules used to associate traffic flows with the requested service class instance.

FIGS. 9-15 illustrate example messaging flows for dynamic QoS pre-authorization systems. The respective diagrams will be generally described with some messaging signal flows discussed in context of other flows. When observing the FIGS. 9-15, SH is subscriber host, WT is wireless terminal BS1 is base station 1 and BS2 is base station 2, MNS is mobile network server, and OH is operator host. As can be appreciated, other components and/or message exchanges can be provided than the examples show.

Figure 9:
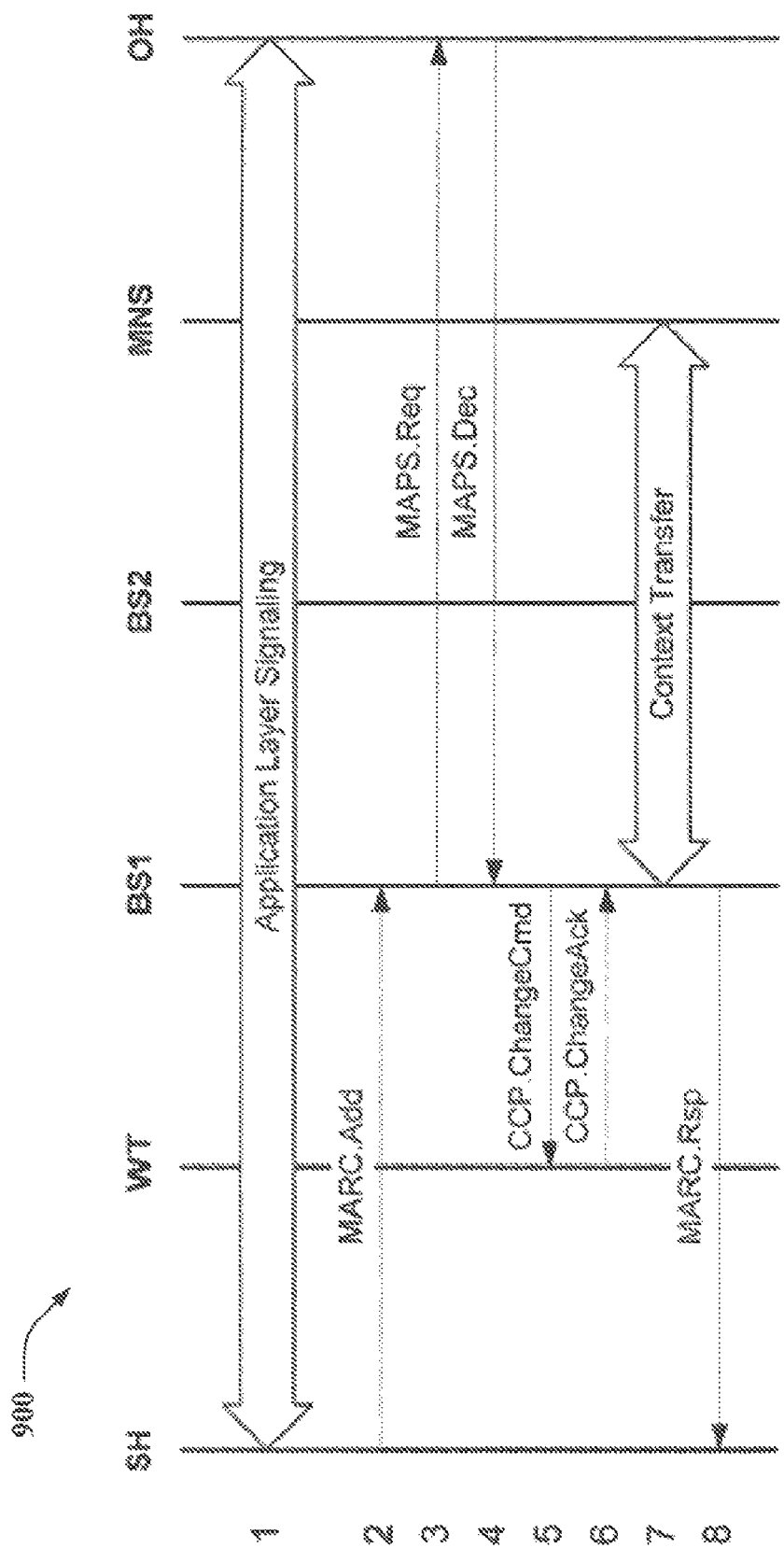
FIGS. 9-15 illustrate example QoS messaging aspects.
Figure 10:
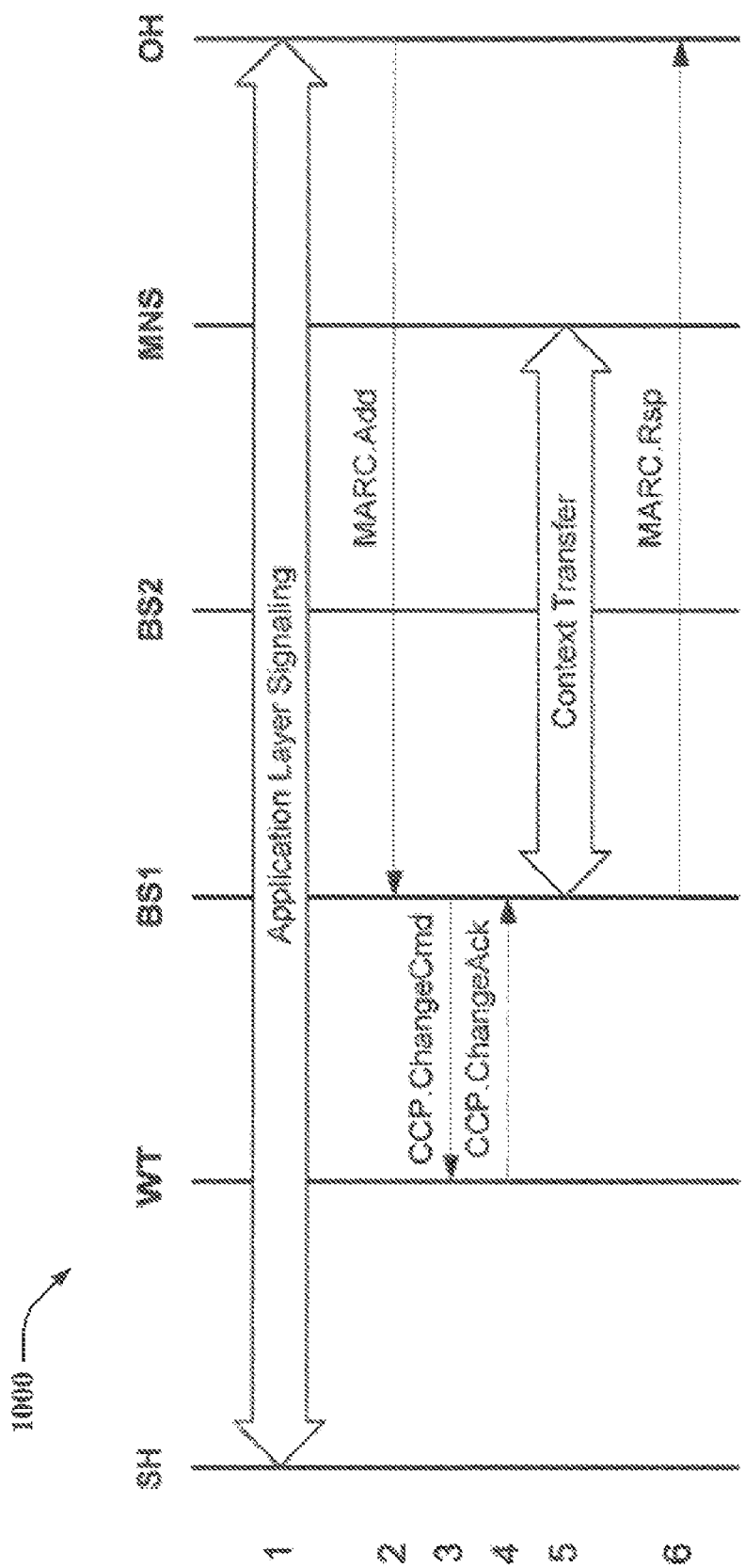

Referring to FIG. 9, an example message flow 900 shows an addition of a service class instance or filter rule. The diagram 900 shows Service Class Instances and/or Filter Rules associated with a particular Subscriber Service may be dynamically added, e.g., at the time an application session is established. The diagram 900 illustrates a typical message exchange when addition of one or more Service Class Instances and/or Filter Rules is requested by a SH, while FIG. 10 illustrates a typical message exchange 1000 when addition of one or more Service Class Instances and/or Filter Rules is requested by on OH on behalf of a SH. In each case, the message flow diagrams 900 and 1000 illustrate the case where the OH is the PDP corresponding to the Subscriber Service for which dynamic QoS configuration changes are requested. It is noted that example protocols mobility-aware resource control (MARC) and mobility-aware policy signaling (MAPS) are shown however it is to be appreciated that other protocols can be employed.

Along with addition, Service Class Instances and/or Filter Rules associated with a particular Subscriber Service may be dynamically modified, e.g., upon re-negotiation of an application session. The MARC protocol for example can be used by a MARC requester to modify a Service Class Instance or Filter rule previously added by the same MARC requester. The message flow diagram corresponding to modification of a Service Class Instance or filter rule previously added by a SH is essentially equivalent to that shown in the diagram 900, with the exception that the SH sends and MARC.Mod message instead of the MARC.Add message. Similar modification protocols can be applied with the diagram 1000 as well.

Figure 11:
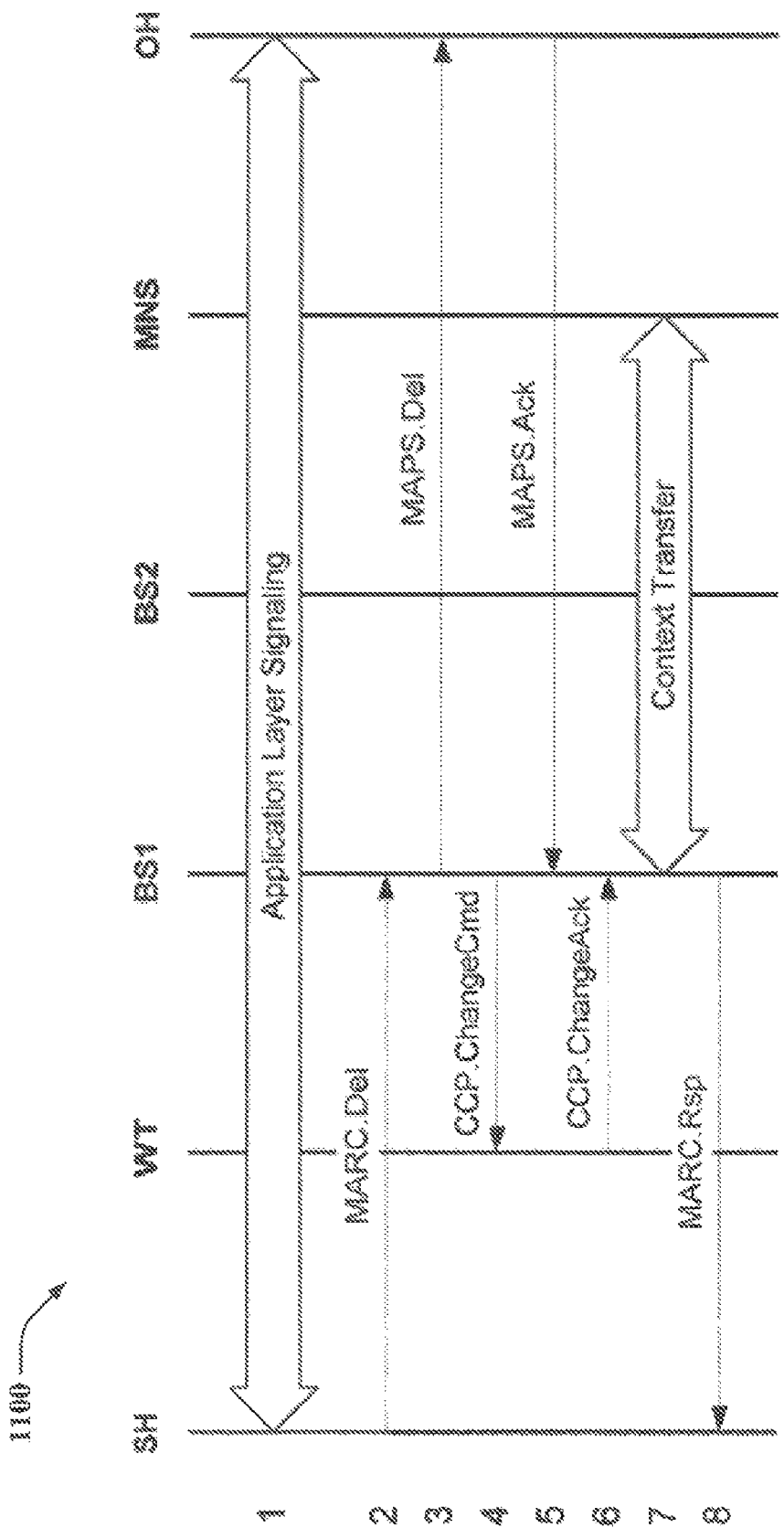
Figure 12:
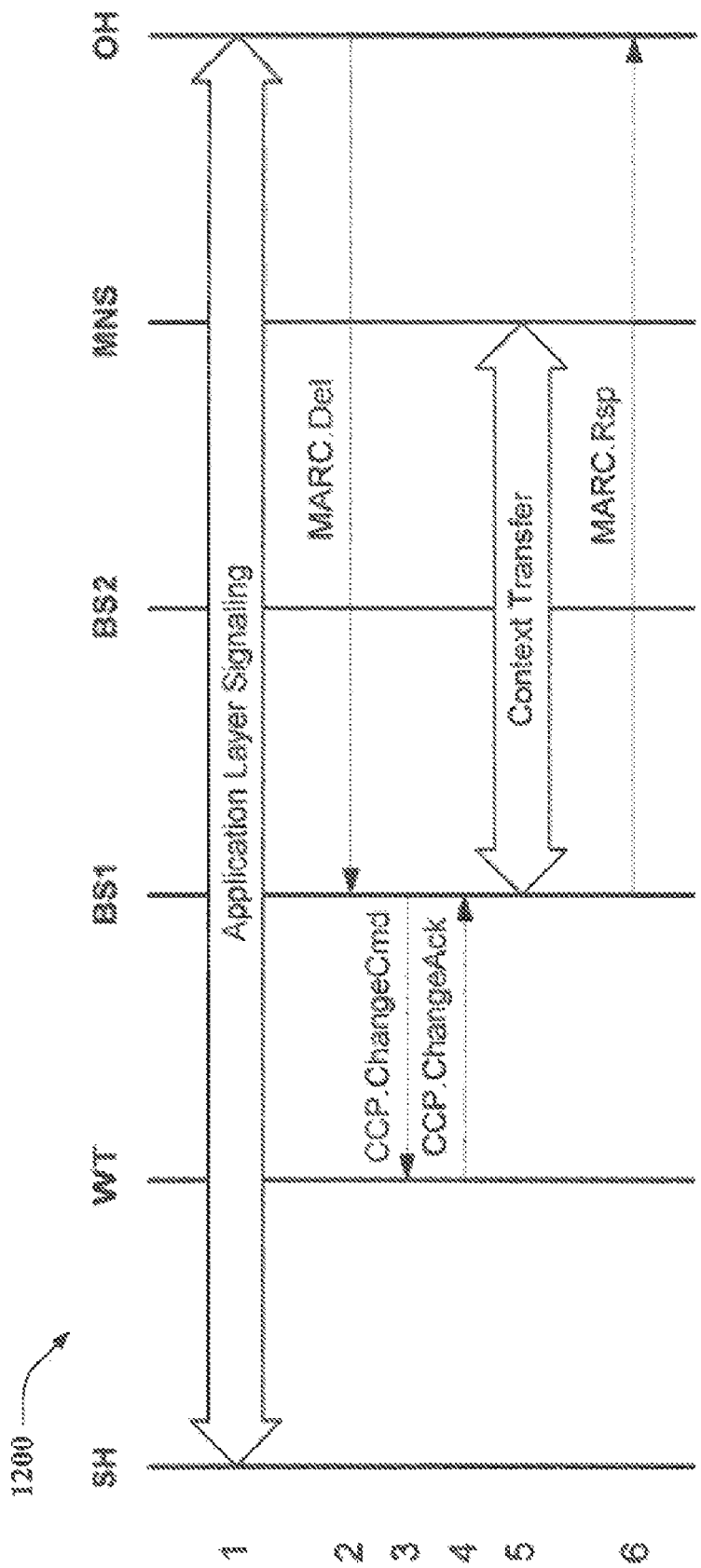

Referring to FIGS. 11 and 12, service deletions concepts are described. Similar to add aspects above, Service Class Instances and/or Filter Rules associated with a particular session. The MARC protocol may be used by a MARC requester to modify a Service Class Instance or filter Rule previously added by the same MARC requester. FIG. 11 illustrates a diagram 1100 of a typical message exchange when deletion of one or more Service Class Instances and/or Filter Rules is requested by an SH, while FIG. 12 illustrates a typical message exchange 1200 when deletion of one or more Service Class Instances and/or Filter Rules is requested by an OH on behalf of a SH. In each case, the message flow diagrams 1100 or 1200 illustrate the case where the OH is the PDP corresponding to the Subscriber Service for which dynamic QoS configuration changes are requested.

Figure 13:
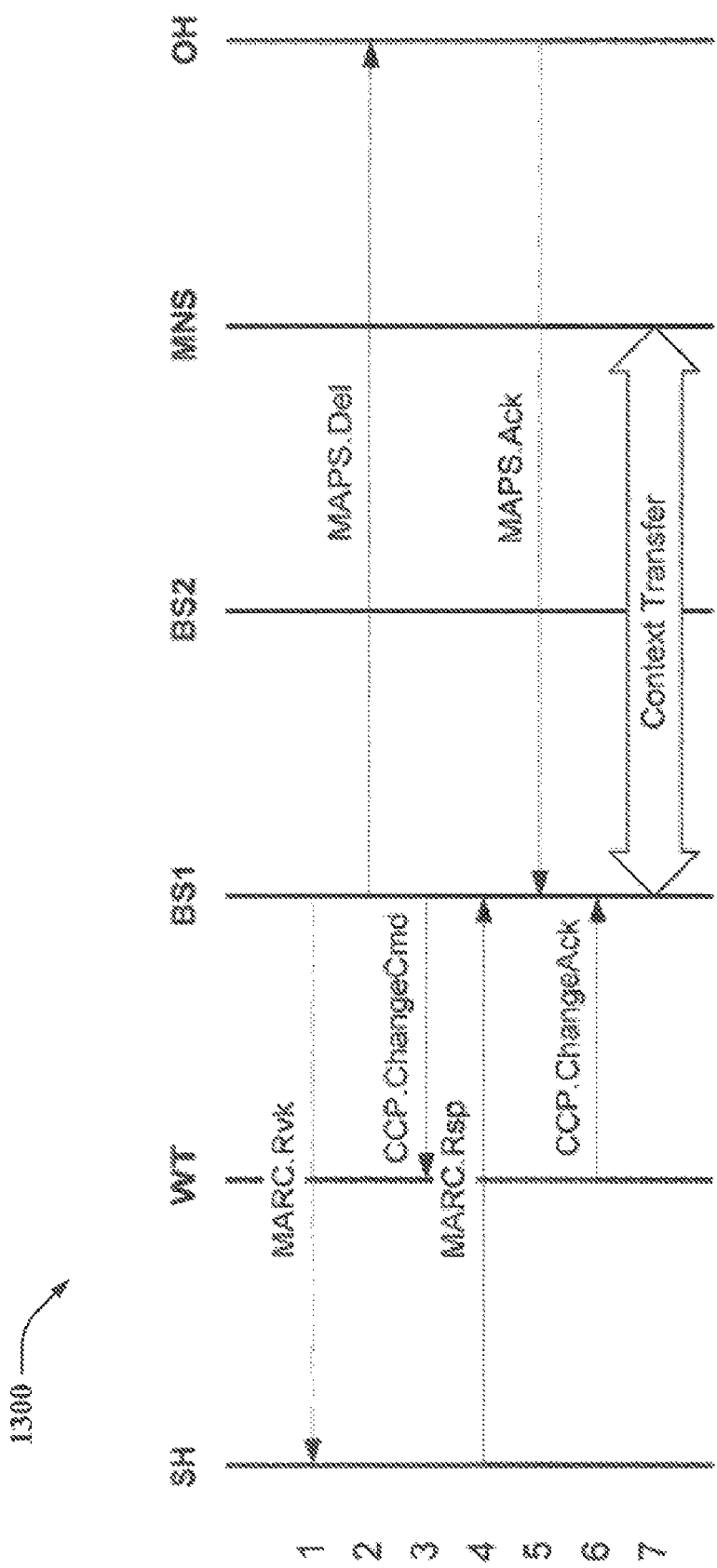
Figure 14:
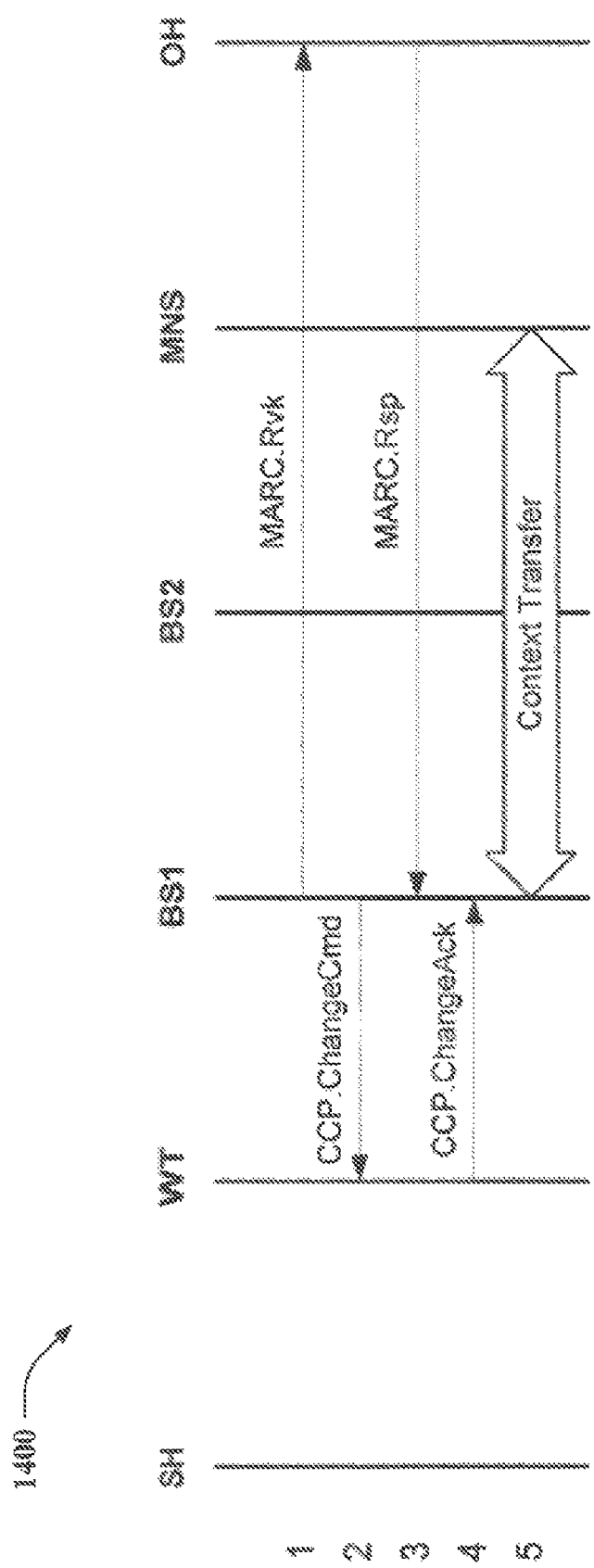

FIGS. 13 and 14 describe mechanisms by which Service Class Instances may be revoked. A BS may revoke a Service Class Instance for a variety of different reasons, typically relating to admission control and/or overload control (e.g., there are insufficient resources to continue supporting the Service Class Instance, or the Service Class Instance is being preempted to allow admission of another Service Class Instance with higher admission priority). When a Service Class Instance is revoked by a BS, any Filter Rules referencing the Service Class Instance can be uninstalled. If the revoked Service Class Instance was initially added via the MARC protocol, the BS can use the MARC protocol for example to inform the corresponding MARC requester that the previously admitted Service Class Instance has been revoked. If the MAPS protocol was used to request a policy decision when the Service Class Instance was initially admitted, the BS can use the MAPS protocol to inform the PDP that the Service Class Instance is no longer needed.

FIG. 13 illustrates a typical message exchange 1300 when a BS revokes a Service Class Instance that was previously admitted upon request by a SH, while FIG. 14 illustrates a typical message exchange 1400 when a BS revokes a Service Class Instance that was previously admitted upon request by a OH on behalf of a SH. In each case, the message flow diagrams 1300 and 1400 illustrate the case where the OH is the PDP corresponding to the Subscriber Service with which the revoked Service Class Instance is associated.

Figure 15:
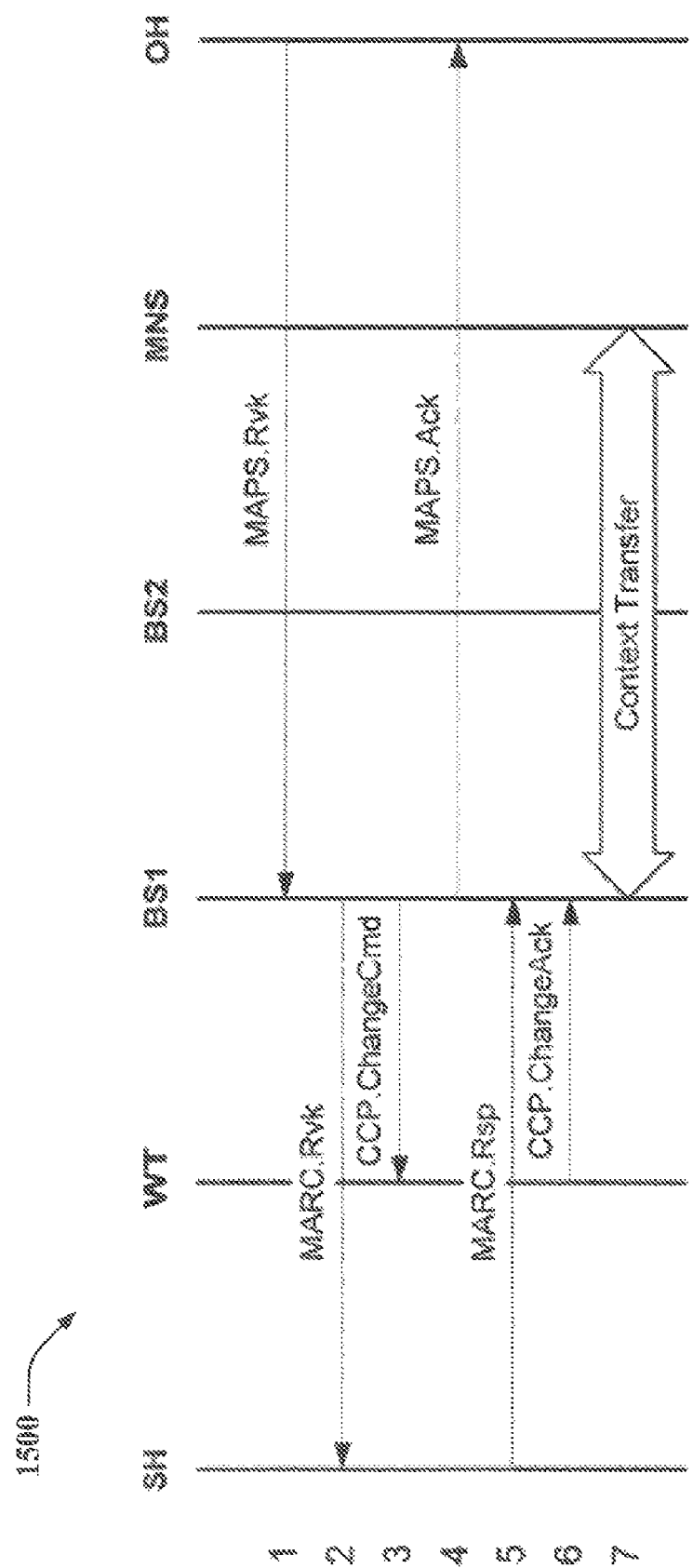

In some cases, the PDP associated with a Subscriber Service may also cause a BS to revoke a previously admitted Service Class Instance by revoking a previous policy decision. A PDP uses the MAPS protocol to inform a BS that a previous policy decision has been revoked. FIG. 15 illustrates a typical message exchange 1500 when a PDP revokes a previous policy decision. The message flow diagram 1500 illustrates the case where the OH is the PDP corresponding to the Subscriber Service and Service Class Instance for which the PDP is revoking its previous policy decision was initially requested by the SH.

Figure 16:
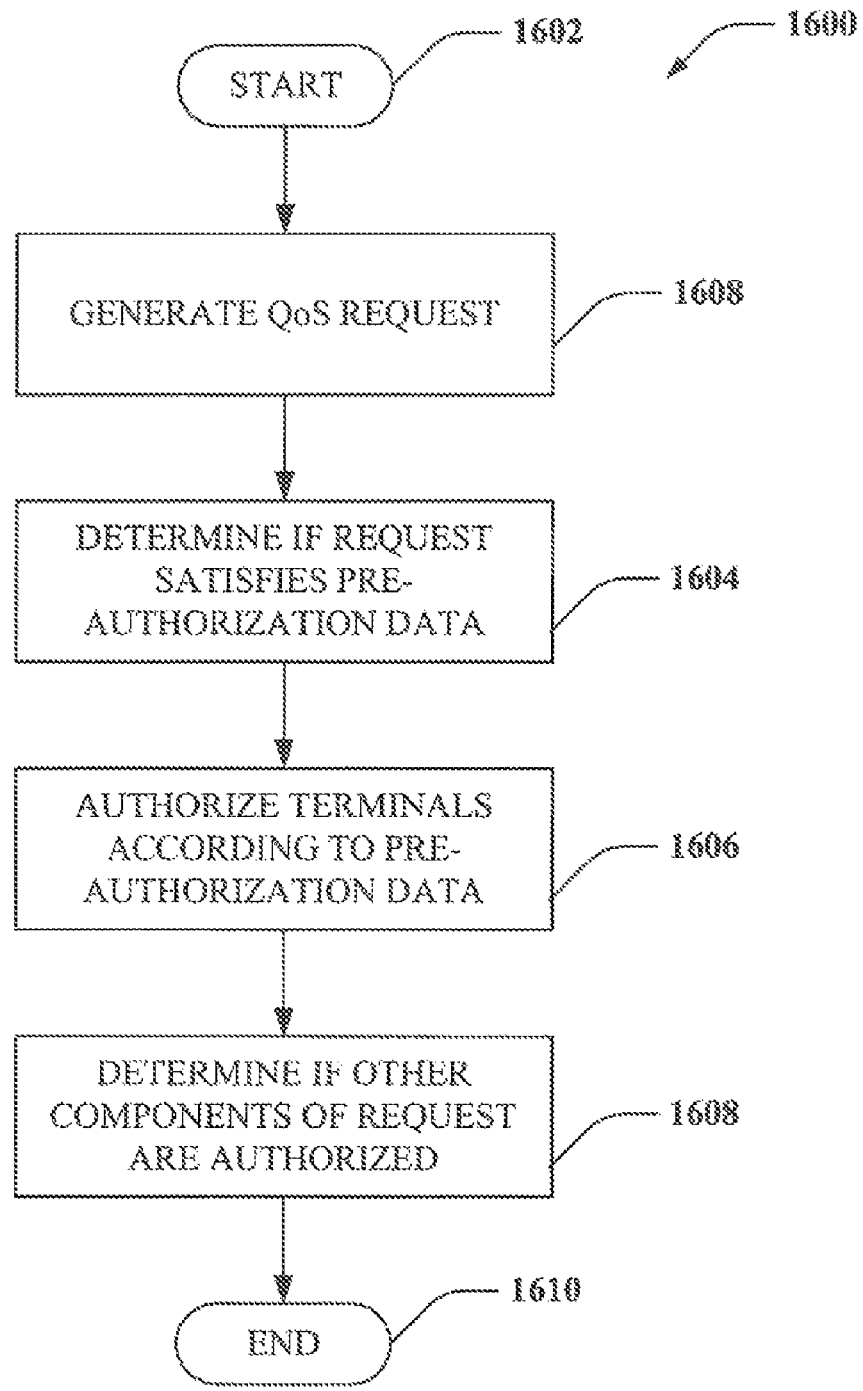
FIG. 16 is a representative flow diagram illustrating a methodology for dynamic pre-authorization QoS processing.

Referring to FIG. 16, a methodology 1600 relating to dynamic QoS pre-authorization processing is illustrated. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Referring specifically to FIG. 16, a methodology 1600 that facilitates dynamic QoS pre-authorization is illustrated. The methodology 1600 begins at 1602, where a QoS request is generated by a terminal. Such request can be in accordance with a profile or template as previously described and can specify more that one act. For instance, the QoS request could specify a desired QoS parameter and specify some other aspect such as the port number that was to be employed by the terminal. At 1604, the request is analyzed at an access node in view of pre-authorization data received at the node such as from an operator's network. For example, pre-authorization for a particular access terminal may relate to QoS services A through G. If a request for service D were received, the respective request and associated terminal could be authorized at 1606 since the request for service D falls within the range of QoS possibilities A through G. At 1608, other parameters of a request can be analyzed and employed for subsequent authorization. Using a port number example, along with authorizing service D in the above request, the access node can further check if the respective node is authorized to communicate via the stipulated port. If so, further communications can commence. If the respective port is not authorized along with the requested QoS service, then further communications can be denied by the access node.

Figure 17:
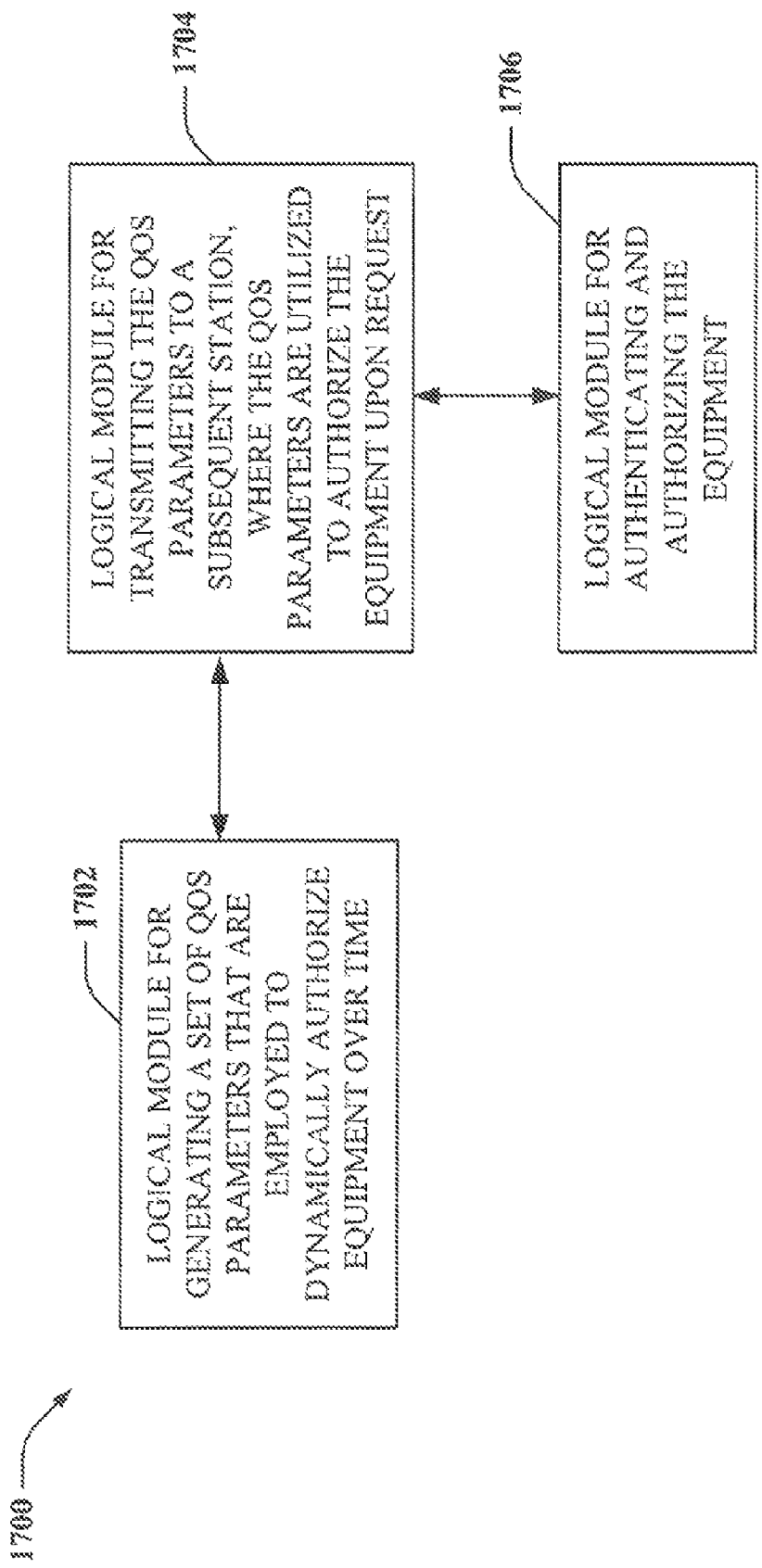
FIGS. 17-19 is a high level block diagram of a system for providing dynamic QoS pre-authorization.
Figure 18:
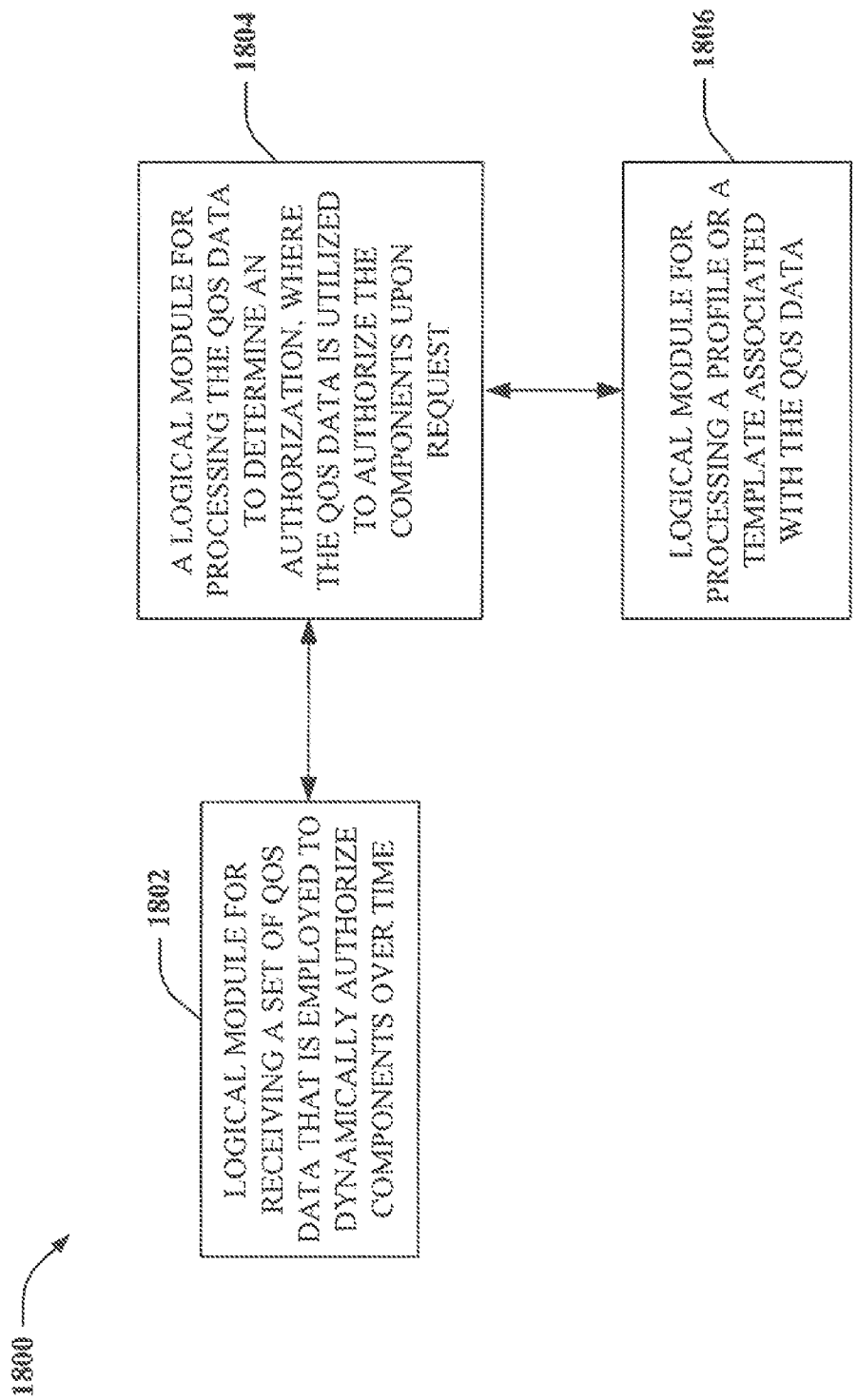
Figure 19:
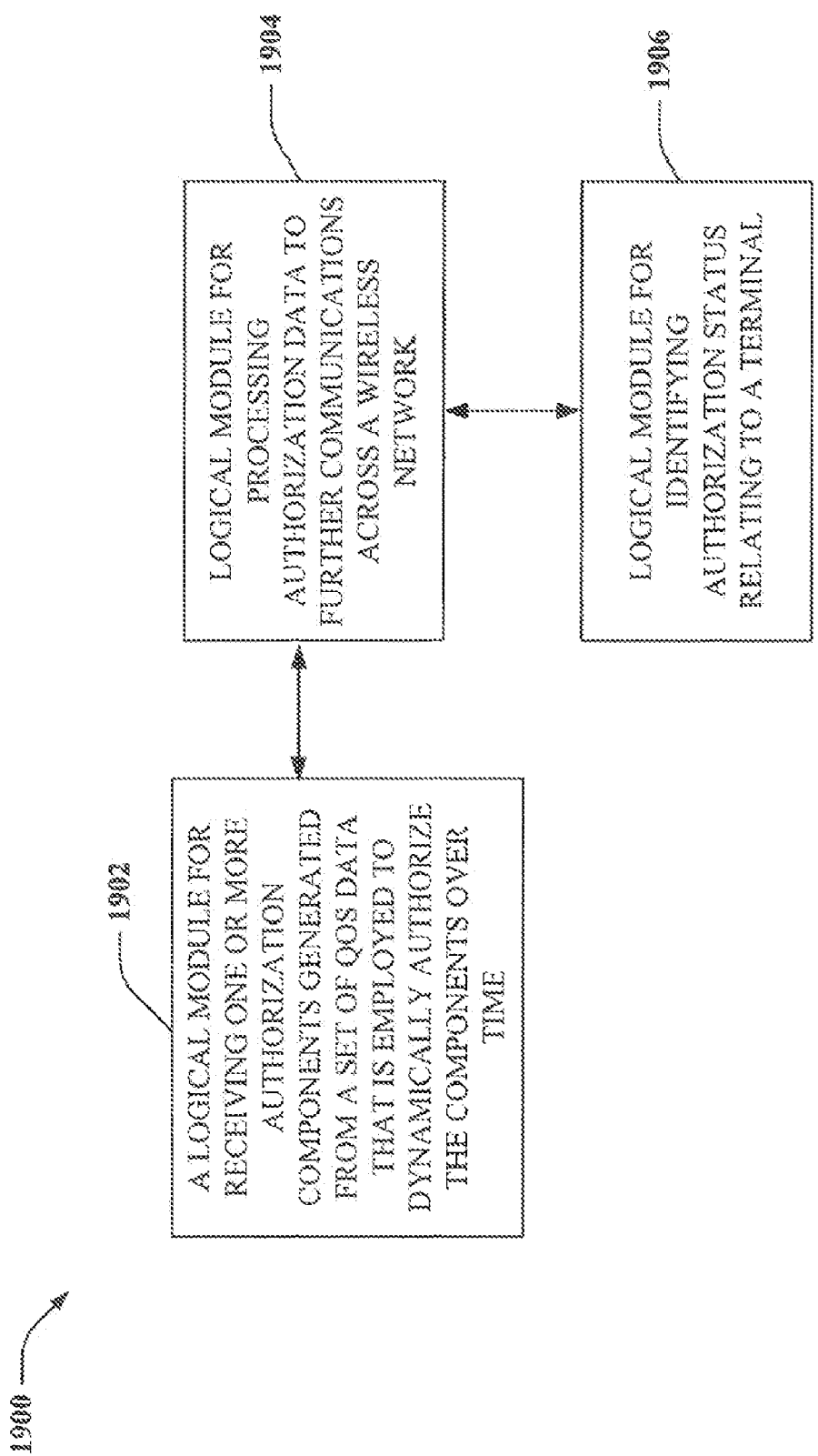

Turning now to FIGS. 17-19 collectively, systems are provided that relate to dynamic QoS pre-authorization with respect to a terminal, operator networks, access nodes, and traffic flows therewith. The systems are represented as a series of interrelated functional blocks, which can represent functions implemented by a processor, software, hardware, firmware, or any suitable combination thereof.

Referring specifically to FIG. 17, a system 1700 that facilitates communications from an operator network. This includes a logical module 1702 for generating a set of QoS parameters that are employed to dynamically authorize equipment over time. A logical module 1704 is employed for transmitting the QoS parameters to a subsequent station, where the QoS parameters are utilized to authorize the equipment upon request. A logical module 1706 can be utilized for authenticating and authorizing the equipment.

Now referring to FIG. 18, a system 1800 that facilitates communications from an access node. The system 1800 includes a logical module 1802 for receiving a set of QoS data that is employed to dynamically authorize components over time. A logical module 1804 is provided for processing the QoS data to determine an authorization, where the QoS data is utilized to authorize the components upon request. A logical module 1806 is employed for processing a profile or a template associated with the QoS data.

Turning now to FIG. 19, a system 1900 is illustrated that facilitates communications from a terminal point of view. The system 1900 includes a logical module 1902 for receiving one or more authorization components generated from a set of QoS data that is employed to dynamically authorize the components over time. A logical module 1904 is employed for processing authorization data to further communications across a wireless network. A logical module 1906 is for identifying authorization status relating to a terminal.

Figure 20:
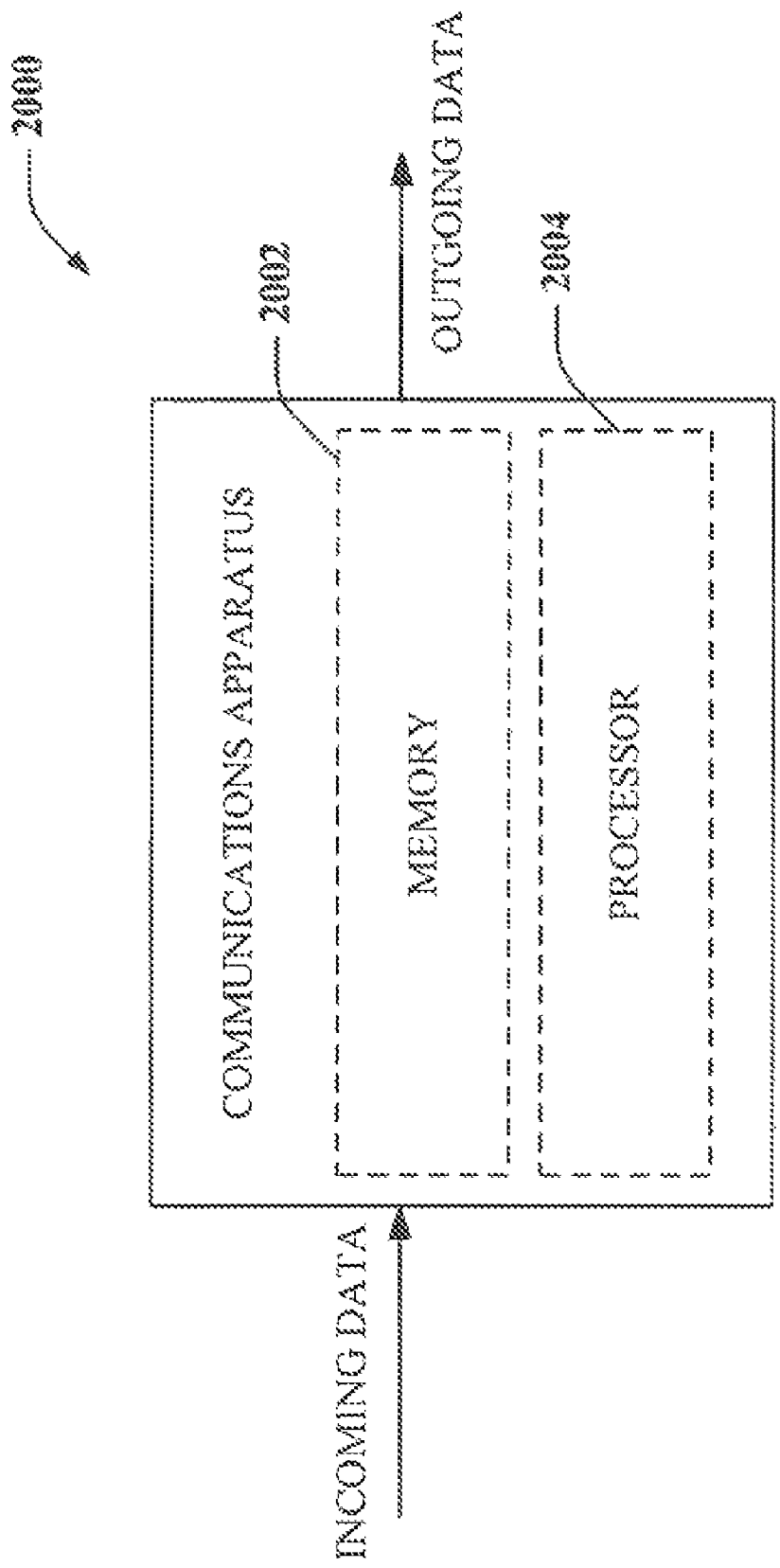
FIG. 20 is a block diagram of an apparatus to process dynamic QoS parameters.

FIG. 20 illustrates a communications apparatus 2000 that can be a wireless communications apparatus, for instance, such as a wireless terminal. Additionally or alternatively, communications apparatus 2000 can be resident within a wired network. communications apparatus 2000 can include memory 2002 that can retain instructions for configuring such apparatus with respect to QoS data for a terminal (and traffic flows associated therewith). Additionally, communications apparatus 2000 may include a processor 2004 that can execute instructions within memory 2002 and/or configuring communications apparatus 2000 or a related communications apparatus.

In an operator network example, the memory 2002 retains instructions for generating a Quality of Service (QoS) data set, the QoS data set employed to dynamically authorize access terminals over time upon request of service parameters from the QoS data set, where the service parameters are associated with a pre-authorized subset of the QoS data set. In another example, the apparatus 2000 might be an access node. Thus, memory 2002 may be employed to receive and process the QoS data set. In yet another example, the apparatus 200 may be a terminal, where the terminal is authorized in view of the QoS data set.

Figure 21:
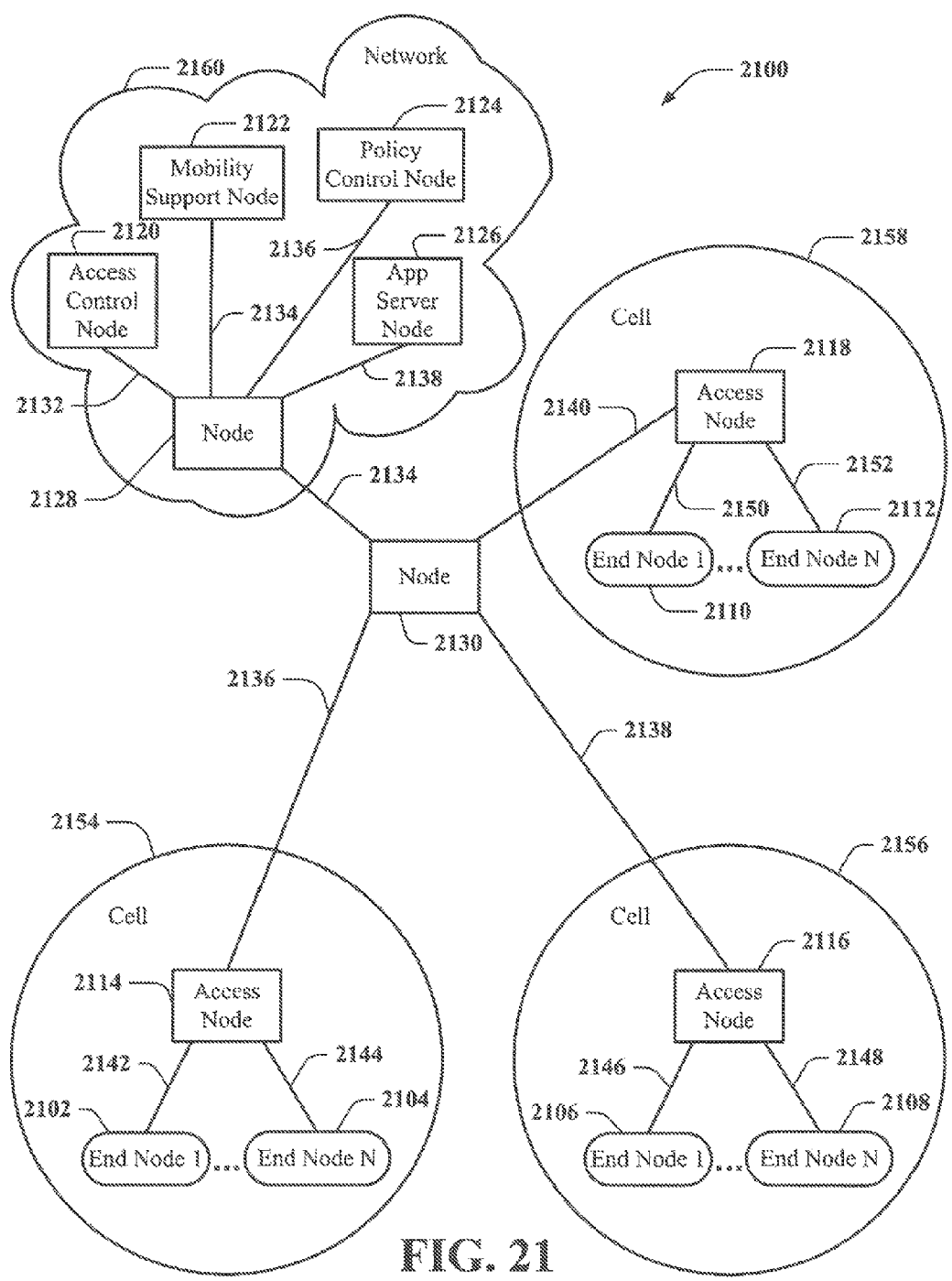
FIG. 21 illustrates an example communications system.

To provide additional context for one or more embodiments described herein, FIG. 21 is provided to illustrate an example communication system 2100 that comprises a plurality of nodes interconnected by communications links. The system 2100 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 2100 exchange information using signals, e.g., messages, based on communication protocols, e.g., the Internet Protocol (IP). The communications links of the system 2100 may be implemented, for example, using wires, fiber optic cables, and/or wireless communications techniques. The system 2100 includes a plurality of end nodes 2102-2112, which access the communication system 2100 by way of a plurality of access nodes 2114-2118. End nodes 2102-2112 may be, e.g., wireless communication devices or terminals, and the access nodes 2114-2118 may be e.g., wireless access routers or base stations. Communication system 2100 also includes a number of other nodes 2120-2130 that are used to provide interconnectivity or to provide specific services or functions.

Communications system 2100 depicts a network 2160 that includes access control node 2120, mobility support node 2122, policy control node 2124, and application server node 2126, all of which are connected to an intermediate network node 2128 by a corresponding network link 2132-2138, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support node 2122, e.g., a Mobile IP home agent and/or context transfer server, supports mobility, e.g., handoff, of end nodes between access nodes, e.g., by way of redirection of traffic to/from end nodes and/or transfer of state associated with end nodes between access nodes. In some embodiments, policy control node 2124, e.g., a policy server or Policy Decision Point (PDP), supports policy authorization for services or application layer sessions. In some embodiments, application server node 2126, e.g., a Session Initiation Protocol server, streaming media server, or other application layer server, supports session signaling for services available to end nodes and/or provides services or content available to end nodes.

Intermediate network node 2128 in network 2160 provides interconnectivity to network nodes that are external from the perspective of network 2160 by way of network link 2134. Network link 2134 is connected to intermediate network node 2130, which provides further connectivity to access nodes 2114, 2116, and 2118 by way of network links 2136-2140, respectively. Each access node 2114-2118 is depicted as providing connectivity to end nodes 2102-2112, respectively, by way of corresponding access links 2142-2152, respectively. In communication system 2100, each access node 2114-2118 is depicted as using wireless technology, e.g., wireless access links, to provide access. A radio coverage area, e.g., communications cells 2154-2158 of each access node 2114-2118, is illustrated as a circle surrounding the corresponding access node.

Communication system 2100 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 2100. Additionally, some of the functional entities depicted in communication system 2100 may be omitted or combined. Location or placement of these functional entities may also be varied.

Figure 22:
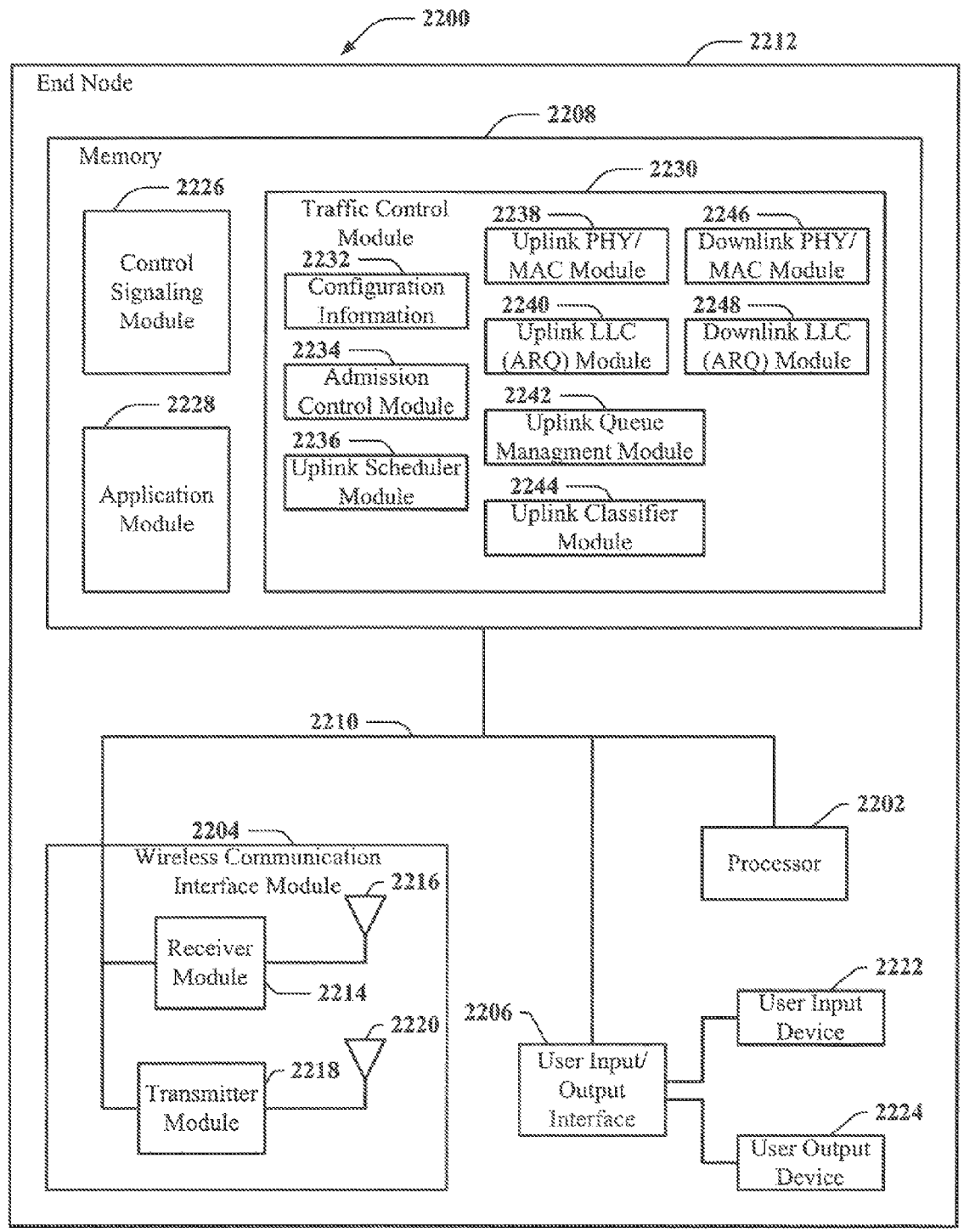
FIG. 22 illustrates an example end node.

FIG. 22 provides an illustration of an example end node 2200, e.g., wireless terminal. End node 2200 is a representation of an apparatus that may be used as any one of end nodes 2102-2112 (FIG. 21). End node 2200 includes a processor 2202, a wireless communication interface module 2204, a user input/output interface 2206 and memory 2208 coupled together by a bus 2210. Accordingly, by way of bus 2210, the various components of the end node 2200 can exchange information, signals and data. Components 2202-2208 of end node 2200 can be located inside a housing 2212.

Wireless communication interface module 2204 provides a mechanism by which the internal components of end node 2200 can send and receive signals to/from external devices and network nodes, e.g., access nodes. Wireless communication interface module 2204 includes, e.g., a receiver module 2214 with a corresponding receiving antenna 2216 and a transmitter module 2218 with a corresponding transmitting antenna 2220 used for coupling end node 2200 to other network nodes, e.g., by way of wireless communications channels.

End node 2200 also includes a user input device 2222, e.g., keypad, and a user output device 2224, e.g., display, which are coupled to bus 2210 through user input/output interface 2206. Thus, user input/output devices 2222 and 2224 can exchange information, signals and data with other components of end node 2200 by way of user input/output interface 2206 and bus 2210. User input/output interface 2206 and associated devices 2222 and 2224 provide mechanisms by which a user can operate end node 2200 to accomplish various tasks. In particular, user input device 2222 and user output device 2224 provide functionality that allows a user to control end node 2200 and applications, e.g., modules, programs, routines and/or functions, that execute in memory 2208 of end node 2200.

Processor 2202, under control of various modules, e.g., routines, included in memory 2208 control operation of end node 2200 to perform various signaling and processing. The modules included in memory 2208 are executed on startup or as called by other modules. Modules may exchange data, information, and signals when executed. Modules may also share data and information when executed. Memory 2208 of end node 2200 includes a control signaling module 2226, an application module 2228, and a traffic control module 2230, which further includes configuration information 2232 and various additional modules.

Control signaling module 2226 controls processing relating to receiving and sending signals, e.g., messages, for controlling operation and/or configuration of various aspects of end node 2200 including, e.g., traffic control module 2230 as well as configuration information 2232 and various additional modules included. In some embodiments, control signaling module 2226 can include state information, e.g., parameters, status and/or other information, relating to operation of end node 2200 and/or one or more signaling protocols supported by control signaling module 2226. In particular, control signaling module 2226 may include configuration information, e.g., end node identification information and/or parameter settings, and operational information, e.g., information about current processing state, status of pending message transactions, etc.

Application module 2228 controls processing and communications relating to one or more applications supported by end node 2200. In some embodiments, application module 2228 processing can include tasks relating to input/output of information by way of the user input/output interface 2206, manipulation of information associated with an application, and/or receiving or sending signals, e.g., messages, associated with an application. In some embodiments, application module 2228 includes state information, e.g., parameters, status and/or other information, relating to operation of one or more applications supported by application module 2228. In particular, application module 2228 may include configuration information, e.g., user identification information and/or parameter settings, and operation information, e.g., information about current processing state, status of pending responses, etc. Applications supported by application module 2228 include, e.g., Voice over IP (VoIP), web browsing, streaming audio/video, instant messaging, file sharing, gaming, etc.

Traffic control module 2230 controls processing relating to receiving and sending data information, e.g., messages, packets, and/or frames through wireless communication interface module 2204. The example traffic control module 2230 includes configuration information 2232 as well as various additional modules that control various aspects of QoS for packets and/or traffic flows, e.g., associated sequence of packets. Various additional modules are included, in some embodiments, to perform particular functions and operations as needed to support specific aspects of traffic control. Modules may be omitted and/or combined as needed depending on the functional requirements of traffic control. A description of each additional module included in traffic control module 2230 follows.

An admission control module 2234 maintains information relating to resource utilization/availability and determines if sufficient resources are available to support QoS parameters desirably associated with particular traffic flows. Resource availability information maintained by admission control module 2234 includes, e.g., packet and/or frame queuing capacity, scheduling capacity, as well as processing and memory capacity needed to support one or more traffic flows. Control signaling module 2226, application module 2228, and/or other modules included in end node 2200 may query admission control module 2234 to determine if sufficient resources are available to support a new or modified traffic flow, where the admission control determination is a function of QoS parameters of the particular traffic flow and QoS parameters defined within a profile. configuration information 2232 can include configuration information, e.g., parameters settings, that affect the operation of admission control module 2234, e.g., an admission control threshold value that indicates percentage of resource that may be allocated prior to rejecting additional request.

An uplink scheduler module 2236 controls processing relating to transmission scheduling, e.g., order and/or timing, and allocation of transmission resources, e.g., information coding rate, transmission time slots, and/or transmission power, for data information, e.g., messages, packets, and/or frames, to be sent by way of wireless communication interface module 2204, e.g., from end node 2200 to an access node. Uplink scheduler module 2236 can schedule transmissions and allocate transmission resources as a function of QoS parameters associated with one or more traffic flows. In some embodiments, scheduling and/or resource allocation operations performed by uplink scheduler module 2236 are additionally a function of channel conditions and other factors, e.g., power budget.

An uplink PHY/MAC module 2238 controls physical (PHY) layer and Media Access Control (MAC) layer processing relating to sending data information, e.g., messages, packets and/or frames, by way of wireless communication interface module 2294, e.g., from end node 2200 to an access node. For instance, operation of uplink PHY/MAC module 2238 includes both sending and receiving control information , e.g., signals or messages, to coordinate sending of data information, e.g., messages, packets, and/or frames. Configuration information 2232 can include configuration information, e.g., parameters settings, that affect the operation of uplink PHY/MAC module 2238, e.g., a frequency, band, channel, spreading code or hoping code to be used for transmissions, an identifier associated with end node 2200, a request dictionary prescribing use of an assignment request channel, etc.

An uplink LLC (ARQ) module 2240 controls Logical Link Control (LLC) layer processing relating to sending data information, e.g., messages, packets, and/or frames, through wireless communication interface module 2204, e.g., from end node 2200 to an access node. Uplink LLC (ARQ) module 2240 includes processing associated with Automatic Repeat Request (ARQ) module 2240 can, for instance, further include processing relating to addition of and LLC header and/or trailer to higher layer messages, e.g., packets, to provide additional functionality, e.g., multi-protocol multiplexing/demultiplexing by way of a type field or error detection through utilization of a checksum field. Uplink LLC (ARQ) module 2240 can additionally perform fragmentation of higher layer messages, e.g., packets, into multiple sub-portions, e.g., frames to be sent by uplink PHY/MAC module 2240. Configuration information 2232 can include configuration information that affect operation of uplink LLC (ARQ) module 2240, e.g., an ARQ window size, maximum number of retransmissions, a discard time, etc.

An uplink queue management module 2242 maintains information and controls processing relating to storage of data information to be sent by way of wireless communication interface module 2204, e.g., from end node 2200 to an access node. Uplink queue management module 2242 can, for example, control storage of data information awaiting transmission and maintain state information regarding data information awaiting transmission on a per traffic flow basis, e.g., packets associated with each traffic flow may be stored in separate queues. For instance, uplink queue management module 2242 supports a variety of queue management techniques and/or capabilities, e.g., head drop, tail drop, as well as various Active Queue management (AQM) mechanisms such as Random Early Detection (RED). Configuration information 2232 can include configuration information that affects operation of uplink queue management module 2242, such as a queue limit, drop strategy, and/or AQM thresholds associated with one or more traffic flows.

An uplink classifier module 2244 controls processing relating to identification of data information as belonging to particular traffic flows prior to being sent by way of the wireless communication interface module 2204, e.g., from end node 2200 to an access ode. In some embodiments, messages, packets, and/or frames to be sent through utilization of wireless communication interface module 2204 are classified as belonging to one of a variety of traffic flows by uplink classifier module 2244 based on inspection of one or more header and/or payload fields. Results of classification by uplink classifier module 2244 can affect the treatment of classified data information by uplink queue management module 2242 as well as other modules within memory 2208. For example, the results may determine a particular queue the message, packet, and/or frame will be associated with for storage and further affect subsequent processing such as scheduling. Configuration information can include configuration information that affect operation of uplink classifier module 2244, e.g., a set of one or more classifier filter rules that prescribe criteria used to associate data information, e.g., messages, packets, and/or frames, as belonging to one or more traffic flows.

A downlink PHY/MAC module 2246 control PHY layer and MAC layer processing relating to receiving data information by way of wireless communication interface module 2204. Operation of downlink PHY/MAC module 2246 can include both sending and receiving control information to coordinate receiving of data information. configuration information 2204 can include configuration information that affect operation of downlink PHY/MAC module 2246, e.g., a frequency, band, channel, spreading code or hoping code to be used for reception, an identifier associated with end node 2200, etc.

A downlink LLC (ARQ) module 2248 controls LLC layer processing relating to receiving data information by way of wireless communication interface module 2204. Downlink LLC (ARQ) module 2248 includes processing associated with ARQ capabilities, e.g., retransmission of lost packets or frames. For example, downlink LLC (ARQ) module 2248 can further include processing relating to an LLC header and/or trailer that encapsulates higher layer messages, which provides additional functionality, e.g., multi-protocol multiplexing/demultiplexing through a type filed or error detection by way of a checksum field. Downlink LLC (ARQ) module 2248 can also perform reassembly of frames received by the downlink PHY/MAC module 2246 into higher layer messages. Configuration information 2232 can, and in some embodiments does, includes configuration information, e.g., parameters settings, that affect operation of downlink LLC (ARQ) module 2248, e.g., and ARQ window size, maximum number of retransmissions, a discard time, etc.

Figure 23:
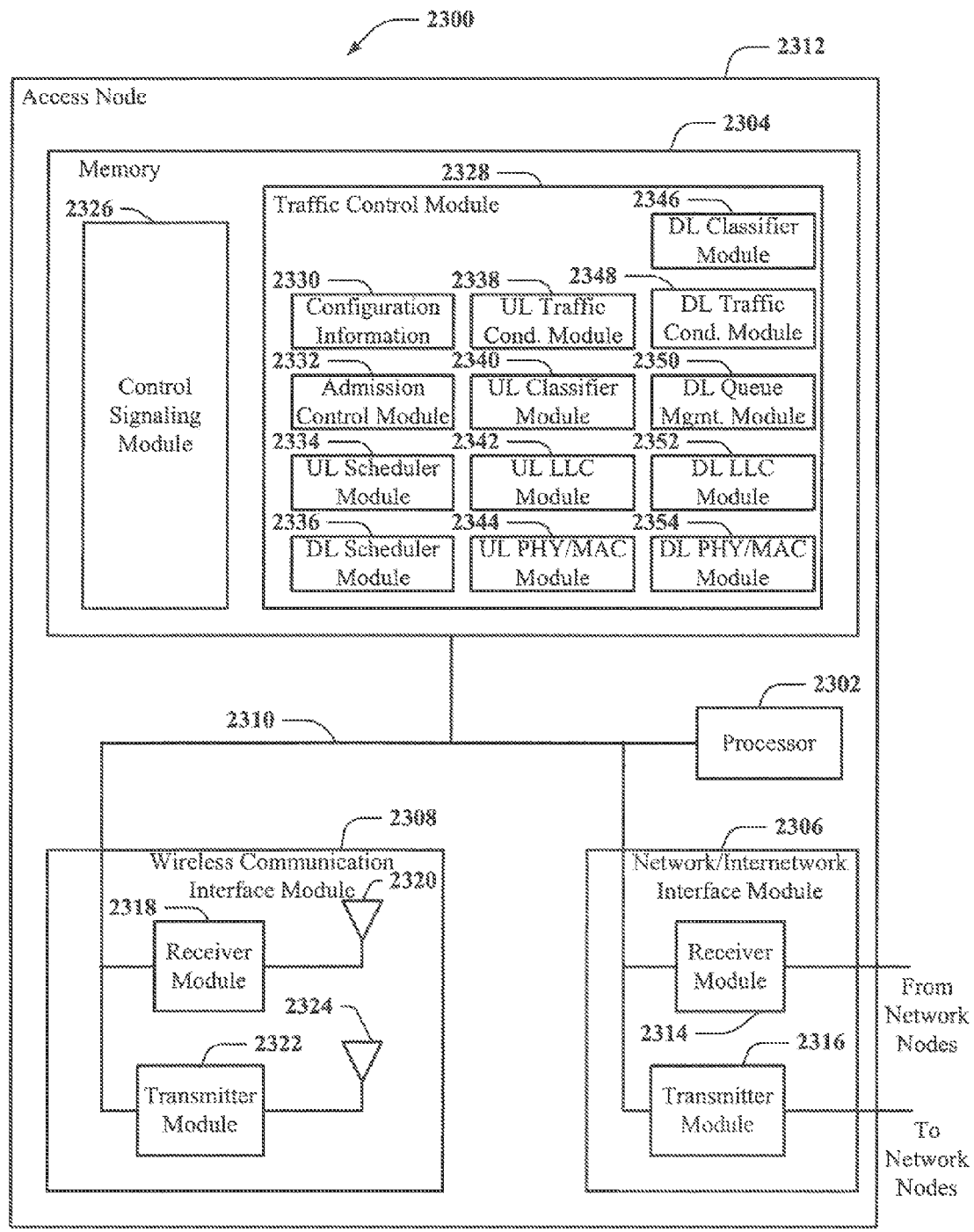
FIG. 23 illustrates an example access node.

FIG. 23 provides a detailed illustration of an example access node 2300 implemented in accordance with the present invention. The access node 2300 is a detailed representation of an apparatus that may be used as any one of the access nodes 2114-2122 depicted in FIG. 21. In the FIG. 23 embodiment, access node 2300 includes a processor 2302, memory 2304, a network/internetwork interface module 2306 and a wireless communication interface module 2308, coupled together by bus 2310. Accordingly, by way of bus 2310 the various components of access node 2300 can exchange information, signals and data. The components 2302-2310 of access node 2300 are located inside a housing 2312.

Network/internetwork interface module 2306 provides a mechanism by which the internal components of access node 2300 can send and receive signals to/from external devices and network nodes. Network/internetwork interface module 2306 includes a receiver module 2314 and a transmitter module 2316 used for coupling node 2300 to other network nodes, e.g., through copper wires or fiber optic lines. Wireless communication interface module 2308 also provides a mechanism by which the internal components of access node 2300 can send and receive signals to/from external devices and network nodes, e.g., end nodes. Wireless communication interface module 2308 includes, e.g., a receiver module 2318 with a corresponding receiving antenna 2320 and a transmitter module 2322 with a corresponding transmitting antenna 2324. Wireless communication interface module 2308 is use for coupling access node 2300 to other nodes, e.g., by way of wireless communication channels.

Processor 2302 under control of various modules, e.g., routines, included in memory 2304 controls operation of access node 2300 to perform various signaling and processing. The modules included in memory 2394 are executed on startup or as called by other modules. Modules may exchange data, information, and signals when executed. Modules may also share data and information when executed. In the FIG. 23 embodiment, memory 2304 of access node 2300 includes a control signaling module 2326 and a traffic control module 2328, which further includes configuration information 2330 and various additional modules 2332-2354.

Control signaling module 2326 controls processing relating to receiving and sending signals, e.g., messages, for controlling operation and/or configuration of various aspects of access node 2300 including, e.g., traffic control module 2328 as well as configuration information 2330 and the various additional modules included therein 2332-2354. For instance, control signaling module 2326 includes state information, e.g., parameters, status and/or other information, relating to operation of access node 2300 and/or one or more signaling protocols supported by control signaling module 2326. In particular, control signaling module 2326 may include configuration information, e.g., access node identification information and/or parameter settings, and operational information, e.g., information about current processing state, status of pending message transactions, etc.

Traffic control module 2328 controls processing relating to receiving and sending data information, e.g., messages, packets, and/or frames, by way of wireless communication interface module 2308. For instance, traffic control module can include configuration information 2330 as well as various additional modules 2332-2354 that control various aspects of quality of service for packets and/or traffic flows, e.g., associated sequences of packets. In some embodiments traffic control module 2328 includes state information, e.g. parameters, status and/or other information, relating to operation of access node 2300, traffic control module 2328, and/or one or more of the various additional modules included therein 2332-2354. Configuration information 2330, e.g., parameter settings, determines, affects and/or prescribes operation of traffic control module 2328 and/or the various additional modules included therein 2332-2354. The various additional modules are included, in some embodiments, to perform particular functions and operations as needed to support specific aspects of traffic control. In various embodiments, modules may be omitted and/or combined as needed depending on the functional requirements of traffic control. A description of each additional module included in traffic control module 2328 follows.

Admission control module 2332 maintains information relating to resource utilization/availability and determines if sufficient resources are available to support quality of service requirements of particular traffic flows. Resource availability information maintained by admission control module 2332 includes, e.g., packet and/or frame queuing capacity, scheduling capacity, as well as processing and memory capacity needed to support one or more traffic flows. Control signaling module 2326 and/or other modules included in access node 2300 can query admission control module 2332 to determine if sufficient resources are available to support a new or modified traffic flow, where the admission control determination is a function of the quality of service requirements of the particular traffic flow and/or the available resources. Configuration information 2330 can include configuration information, e.g., parameters settings, that affect the operation of admission control module 2332, e.g., an admission control threshold value that indicates the percentage of resource that may be allocated prior to rejecting additional requests.

Uplink scheduler module 2334 controls processing relating to transmission scheduling, e.g., order and/or timing, and allocation of transmission resources, e.g. information coding rate, transmission time slots, and/or transmission power, for data information, e.g., messages, packets, and/or frames, to be sent from one or more end nodes to the access node by way of wireless interface module 2308. Uplink scheduler module 2334 can schedule transmissions and allocate transmission resources as a function of the quality of service requirements and/or constraints associated with one or more traffic flows and/or one or more end nodes. Configuration information 2330 can include configuration information that affect the operation of uplink scheduler module 2334, e.g., a priority, rate bound, latency bound, and/or sharing weight associated with one or more traffic flows and/or end nodes. In some embodiments, scheduling and/or resource allocation operations performed by uplink scheduler module 2334 are additionally a function of channel conditions and other factors, e.g., power budget.

Downlink scheduler module 2336 controls processing relating to transmission scheduling, e.g., order and/or timing, and allocation of transmission resources, e.g., information coding rate, transmission time slots, and/or transmission power, for data information, e.g., messages, packets and/or frames, to be sent from access node 2300 to one or more end nodes through wireless interface module 2308. Downlink scheduler module 2336 can schedule transmissions and allocate transmission resources as a function of the quality of service requirements and/or constraints associated with one or more traffic flows and/or one or more end nodes. Configuration information 2330 can include configuration information that affects the operation of downlink scheduler module 2336, e.g., a priority, rate bound, latency bound, and/or sharing weight associated with one or more traffic flows and/or end nodes. In some embodiments, scheduling and/or resource allocation operations performed by the downlink scheduler module 2336 are additionally a function of channel conditions and other factors, e.g., power budget.

Uplink traffic conditioner module 2338 controls processing relating to traffic conditioning, e.g., metering, marking, policing, etc., for data information, e.g., messages, packets, and/or frames, received by way of wireless interface module 2308, e.g., from an end node to access node 2300. Uplink traffic conditioner module 2338 can condition traffic, e.g., meter, mark and/or police, as a function of the quality of service requirements and/or constraints associated with one or more traffic flows and/or one or more end nodes. Configuration information 2330 can include configuration information that affects the operation of uplink traffic conditioner module 2338, e.g., a rate bound, and/or marking value associated with one or more traffic flows and/or end nodes.

Uplink classifier module 2340 controls processing relating to identification of data information, e.g., messages, packets, and/or frames, received through wireless interface module 2308, e.g., from and end node to access node 2300, as belonging to particular traffic flows prior to being processed by uplink traffic conditioner module 2338. In some embodiments, messages, packets, and/or frames received through wireless communication interface module 2308 are classified as belonging to one of a variety of traffic flows by uplink classifier module 2340 based on inspection of one or more header and/or payload fields. The results of classification by uplink classifier module 2340 can affect the treatment of the classified data information, e.g., messages, packets, and/or frames, by uplink traffic conditioner module 2338, e.g., the results may determine a particular data structure or state machine the message, packet, and/or frame will be associated with the further affect subsequent processing such as metering, marking, and/or policing. Configuration information 2330 can include configuration information that affects the operation of uplink classifier module 2340, e.g., a set of one or more classifier filter rules that prescribe criteria used to associate data information, e.g., messages, packets, and/or frames, as belonging to one or more traffic flows.

Uplink LLC (ARQ) module 2342 controls LLC layer processing relating to receiving data information, e.g., packets and/or frames, by way of wireless communication interface module 2308, e.g., from an end node to access node 2300. Uplink LLC (ARQ) module 2342 includes processing associated with ARQ capabilities, e.g., retransmission of lost packets or frames. In some embodiments, uplink LLC (ARQ) module 2342 further includes processing relating to an LLC header and/or trailer that encapsulates higher layer messages, e.g., packets, which provides additional functionality, e.g., multi-protocol multiplexing/demultiplexing through a type field or error detection by way of a checksum field. Uplink LLC (ARQ) module 2342 can also perform reassembly of frames received by uplink PHY/MAC module 2344 into higher layer messages, e.g., packets. The configuration information 2330 can include configuration information that affects the operation of uplink LLC (ARQ) module 2342, e.g., an ARQ window size, maximum number of retransmissions, a discard time, etc.

Uplink PHY/MAC module 2344 control PHY layer and MAC layer processing relating to receiving data information, e.g., packets and/or frames, by way of wireless communication interface module 2308, e.g., from an end node to access node 2300. In some embodiments, operation of uplink PHY/MAC module 2344 includes both sending and receiving control information, e.g., signals or messages, to coordinate receiving of data information, e.g., messages packets, or frames. Configuration information 2330 can include configuration information that affects the operation of uplink PHY/MAC module 2344, e.g., a frequency, band, channel, spreading code or hopping code to be used for reception, an identifier associated with access node 2300, etc.

Downlink classifier module 2346 controls processing relating to identification of data information, e.g., messages, packets, and/or frames, as belonging to a particular traffic flows prior to being sent through wireless communication interface module 2308, e.g., from access node 2300 to an end node. In some embodiments, messages, packets, and/or frames to be sent by way of wireless communication interface module 2308 are classified as belonging to one of a variety of traffic flows by downlink classifier module 2346 based on inspection of one or more header and/or payload fields. The results of classification by downlink classifier module 2346 can affect the treatment of the classified data information, e.g., messages, packets, and/or frames, by downlink queue management module 2350 and other modules 2348, 2352, and 2354, e.g., the results may determine a particular queue the message, packet, and/or frame will be associated with for storage and further affect subsequent processing such as scheduling. Configuration information 2330 can include configuration information, e.g., parameters settings, that affect the operation of downlink classifier module 2346, e.g., a set of one or more classifier filter rules that prescribe criteria used to associate data information, e.g., messages, packets, and/or frames, as belonging to one or more traffic flows.

Downlink traffic conditioner module 2348 controls processing relating to traffic conditioning, e.g., metering, marking, policing, etc., for data information, e.g., messages, packets, and/or frames, to be sent by way of wireless interface module 2308, e.g., from access node 2300 to an end node. Downlink traffic conditioner module 2348 can condition traffic, e.g., meter, mark and/or police, as a function of the quality of service requirements and/or constraints associated with one or more traffic flows and/or one or more end nodes. Configuration information 2330 can include configuration information that affects the operation of downlink traffic conditioner module 2348, e.g., a rate bound, and/or marking value associated with one or more traffic flows and/or end nodes.

Downlink queue management module 2350 maintains information and controls processing relating to storage of data information, e.g., messages, packets, and/or frames, to be sent by way of wireless communication interface module 2308, e.g., from access node 2300 to an end node. Downlink queue management module can control storage of data information awaiting transmission and maintain state information regarding data information awaiting transmission on a per traffic flow basis, e.g., packets associated with each traffic flow may be stored in separate queues. In some embodiments of, Downlink queue management module 2350 supports a variety of queue management techniques and/or capabilities, e.g., head drop, as well as various AQM mechanisms such as RED. Configuration information 2330 can include configuration information that affects the operation of downlink queue management module 2350, e.g., a queue limit, drop strategy, and/or AQM thresholds associated with one or more traffic flows.

Downlink LLC (ARQ) module 2352 controls LLC layer processing relating to sending data information, e.g., messages, packets, and/or frames, by way of wireless communication interface module 2308, e.g., from access node 2300 to an end node. Downlink LLC (ARQ) module 2352 includes processing associated with ARQ capabilities, e.g., retransmission of lost packets or frames. In some embodiments, downlink LLC (ARQ) module 2352 further includes processing relating to the addition of an LLC header and/or trailer to higher layer messages, e.g., packets, to provide additional functionality, e.g., multi-protocol multiplexing/demultiplexing through a type field or error detection by way of a checksum field. Downlink LLC (ARQ) module 2352 can also perform fragmentation of higher layer messages, e.g., packets, into multiple sub-portions, e.g., frames to be sent by downlink PHY/MAC module 2354. Configuration information 2330 can include configuration information that affects the operation of downlink LLC (ARQ) module 2352, e.g., an ARQ window size, maximum number of retransmissions, a discard timer, etc.

Downlink PHY/MAC module 2354 controls PHY layer and MAC layer processing relating to sending data information, e.g., messages, packets, and/or frames, by way of wireless communication interface module 2308, e.g., from access node 2300 to an end node. In some embodiments, operation of downlink PHY/MAC module 2354 includes both sending and receiving control information, e.g., signals or messages, to coordinate sending of data information, e.g., messages, packets, or frames. Configuration information 2330 can include configuration information that affects the operation of downlink PHY/MAC module 2354, e.g., a frequency, band, channel, spreading code or hoping code to be used for transmissions, an identifier associated with the access node 2300, etc.

Figure 24:
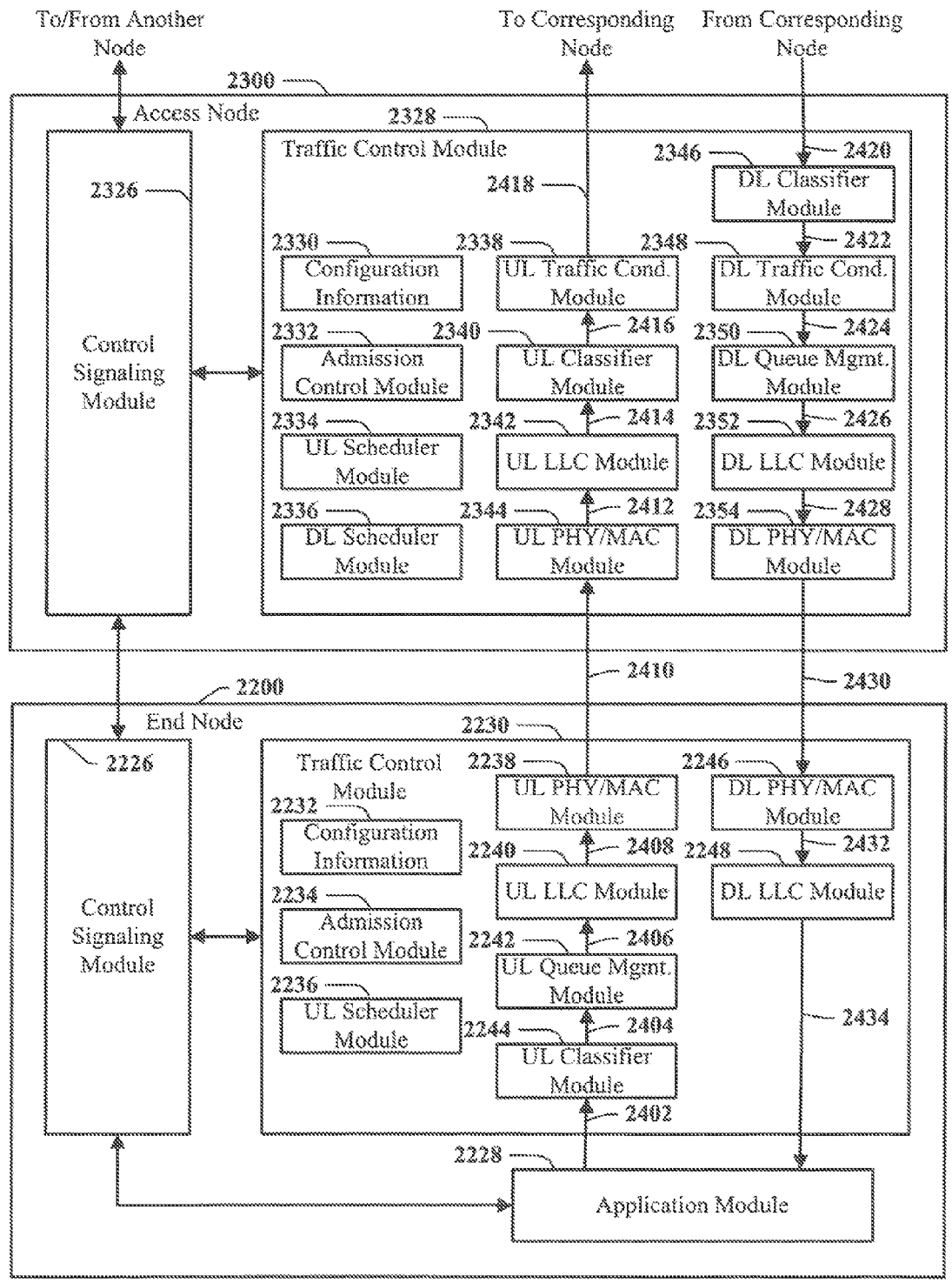
FIG. 24 illustrates an example end node communicating with an example access node.

FIG. 24 illustrates example signaling and traffic flows between various modules included in example end node 2200 and example access node 2300. The FIG. 24 end node 2200 and FIG. 24 access node 2300 are simplified representations of the FIG. 22 end node 2200 and FIG. 23 access node 2300, respectively. The FIG. 24 example shows application module 2228 sending and receiving data information, e.g., traffic flows comprising a sequence of messages, packets, or frames. In the context of the FIG. 21 example system, the FIG. 24 end node 2200 may be any one of end nodes 2102-2112 depicted in FIG. 21 and the application module 2228 included in the FIG. 24 end node 2200 may be exchanging data information with another node in the system, e.g., another end node 2102-2112 or the application server node 2126 as depicted in FIG. 21. In FIG. 24 and the subsequent description, the node with which the FIG. 24 end node 2200 is exchanging data information is referred to as the corresponding node.

The data information, e.g., traffic flows comprising a sequence of messages, packets, or frames, sent from the application module 2228 in the end node 2200 to a corresponding node is shown by a sequence of arrows 2402-2408 to proceed through a sequence of modules 2238-2244 included in end node 2200 for processing, after which the data information is sent from the end node 2200 for processing, e.g., by way of wireless communication interface module 2204. Following reception by access node 2300, e.g., by way of wireless communication interface module 2308, the data information, e.g., traffic flows comprising a sequence of messages, packets, or frames, sent from the application module 2228 in end node 2200 to the corresponding node is shown by a sequence of arrows 2410-2418 to proceed through a sequence of modules 2338-2344 included in access node 2300 for processing, prior to being forwarded from the access node 2300 toward the corresponding node, e.g., directed in accordance with routing information to an intermediate node connected to the access node by way of network/internetwork interface module 2306.

The data information, e.g., traffic flows comprising a sequence of messages, packets, or frames, sent from a corresponding node to application module 2228 in end node 2228 is shown by a sequence of arrows 2420-2428 to be received by access node 2300, e.g., by way of network/internetwork interface module 2306, and then to proceed through a sequence of modules 2346-2354 included in access node 2300 for processing, after which the data information is sent from the access node 2300 to the end node 2200, e.g., via the wireless communication interface module 2308. Following reception by end node 2200, e.g., by way of wireless communication interface module 2204, the data information, e.g., traffic flows comprising a sequence of messages, packets, or frames, sent from the corresponding node to application module 2228 in end node 2200 is shown by a sequence of arrows 2430-2434 to proceed through a sequence of modules 2246 and 2248 included in end node 2200 for processing, prior to being delivered to the application module 2228 in end node 2200.

In addition to the exchange of data information, e.g., traffic flows, FIG. 24 also depicts the exchange of control information, e.g., signaling flows and/or communication interfaces. In particular, the FIG. 24 example depicts the exchange of control information between control signaling module 2326 and traffic control module 2328 included in access node 2300. Similarly, the FIG. 24 example depicts the exchange of control information between control signaling module 2226 and the traffic control module 2230 included in the end node 2200. In both access node 2300 and end ode 2200, exchange of control information between the modules as shown allows the respective control signaling module 2326/2226 in the access/end node 2300/2200 to affect, e.g., set, modify, and/or monitor, the configuration and/or operation of the various modules included in the respective traffic control module 2328/2230, as needed to provide the proper quality of service treatment of the data information, e.g., traffic flows, to/from the application module 2228 in the end node 2200.

The exchange of control information, e.g., signaling flows and/or communication interfaces, is also shown a) between another node and control signaling module 2326 in access node 2300, b) between application module 2228 in end node 2200 and control signaling module 2226 in end node 2200, and c) between the respective control signaling modules 2326/2226 in access node 2300 and end node 2200. These exchanges of control information, e.g., signaling flows and/or communication interfaces, enable the configuration and/or operation of traffic control modules 2328/2230 in both access node 2300 and the end node 2200 to be affected by a) one or more additional nodes, e.g. the access control node 2120 and/or application server node 2126, b) application module 2228 in end node 2200, or c) a combination of one or more additional nodes and the application module 2228 in end node 2200. Various embodiments of the present invention may, and do, support all or only a subset of the depicted control information exchanges as needed.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating an access node, the method comprising:
   receiving, at the access node, a set of data relating to Quality of Service (QoS) pre-authorization providing information on at least one QoS service said access node can provide on request;
   receiving, at the access node, a request from a wireless terminal for a QoS service;
   determining, at the access node, if said requested QoS service is pre-authorized; and
   sending an authorization request from the access node if the access node determined that the requested QoS service is not pre-authorized.

2. The method of claim 1, further comprising performing authentication and authorization for devices within a network or enabling definition and provisioning of services for subscribers in a network.

3. The method of claim 1,
   wherein said set of data relating to QoS pre-authorization is included in a subscriber profile; and
   wherein the method further comprises operating the access node to provide the requested QoS service to said wireless terminal when said data relating to QoS pre-authorization indicates that said requested QoS service is pre-authorized.

4. The method of claim 3, wherein the subscriber profile provides service differentiation between subscribers or application services authorized by a given subscriber.

5. The method of claim 1, wherein said set of data relating to QoS pre-authorization includes information indicating authorization to use of one or more services or types of service.

6. The method of claim 1, wherein said set of data relating to QoS pre-authorization includes information indicating one or more entities authorized to perform subsequent dynamic QoS configuration changes associated with one or more services.

7. The method of claim 1, wherein said set of data relating to QoS pre-authorization includes information for controlling subsequent dynamic QoS configuration changes to one or more QoS configuration parameters.

8. The method of claim 1, wherein said set of data relating to QoS pre-authorization includes one or more templates that prescribe the allowable dynamic configuration associated with a particular service, type of service, or identifiable traffic flow.

9. The method of claim 8, wherein at least one template included in said set of data relating to QoS pre-authorization includes parameters associated with identification of packets as belonging to a traffic flow, parameters associated with traffic conditioning of a traffic flow, parameters associated with queuing/scheduling of a traffic flow, or parameters characterizing a traffic flow that enables an access node to determine a suitable QoS configuration to provide servicing of the traffic flow.

10. The method of claim 1, wherein said set of data relating to QoS pre-authorization includes information indicating another entity to which a request for authorization should be sent if a received request for QoS configuration is not pre-authorized.

11. The method of claim 1, further comprising operating the access node to communicate via an authorization service or a policy component.

12. The method of claim 1,
   wherein said received request includes a parameter indicating a port number to be used by the wireless terminal; and
   wherein the method further comprising:
   checking to determine if the wireless terminal is authorized to communicate using the port identified by the port number included in said received request; and
   denying the received request when it is determined that the wireless terminal is not authorized to communicate using the port identified by the port number included in said received request.

13. The method of claim 1, further comprising:
granting the requested QoS service if it is determined by the access node that the requested QoS service is pre-authorized.

14. An access node comprising:
a memory that retains instructions for controlling said access node to perform the steps of
receiving a set of data relating to Quality of Service (QoS) pre-authorization providing information on at least one QoS service said access node can provide on request, receiving, from a wireless terminal, a request for a QoS service ;
determining if said requested QoS service is pre-authorized; and
sending an authorization request if the requested QoS service is not pre-authorized; and
a processor that executes the instructions.

15. The access node of claim 14 wherein said access node is a base station.

16. The access node of claim 14, wherein said memory further includes instructions for controlling said access node to perform the steps of:
checking to determine if a wireless terminal is authorized to communicate using a port identified by a port number included in said received request; and
denying the received request when it is determined that the wireless terminal is not authorized to communicate using the port identified by the port number included in the received request.

17. An access node comprising:
means for receiving a set of QoS data relating to Quality of Service(QoS) pre-authorization that includes information on at least one QoS service said access node can provide on request;
means for processing the QoS data to determine if a QoS service requested by a wireless terminal is pre-authorized; and
means for generating an authorization request if said QoS service requested by the wireless terminal is not pre-authorized.

18. The communications apparatus of claim 17, further comprising:
means for sending a generated authorization request to a node responsible for responding to authorization requests from access nodes; and
means for processing a profile or a template associated with the QoS data.

19. A non-transitory machine-readable medium having stored thereon machine-executable instructions for controlling a processor to perform the steps of:
receiving a set of data relating to Quality of Service (QoS) pre-authorization providing information on at least one QoS service an access node can provide on request;
determining if a QoS service requested in a request from a wireless terminal is pre-authorized:
generating an authorization request if a request for QoS configuration is not pre-authorized; and
sending the generated authorization request to a node responsible for processing authorization requests if the requested QoS service is not pre-authorized.

20. The non-transitory machine-readable medium of claim 19, further having machine executable instructions stored thereon for controlling the processor to perform the steps of:
checking to determine if the wireless terminal is authorized to communicate using a port identified by a port number included in said received request; and
denying the received request when it is determined that the wireless terminal is not authorized to communicate using the port identified by the port number included in said received request.

21. An access node comprising:
a processor configured to control said access node to perform the steps of:
receiving a set of data relating to Quality of Service (QoS) pre-authorization providing information on at least one QoS service said access node can provide on request;
receiving, from a wireless terminal, a request for a QoS service;
determining if said requested QoS service is pre-authorized; and
sending an authorization request if the requested QoS service is not pre-authorized; and
a memory coupled to said processor including instructions used to control said processor.

* * * * *